United States Patent
Namba et al.

(10) Patent No.: US 9,793,016 B2
(45) Date of Patent: Oct. 17, 2017

(54) INSPECTION METHOD AND INSPECTION DEVICE

(71) Applicant: MITSUBISHI HEAVY INDUSTRIES, LTD., Tokyo (JP)

(72) Inventors: Kazushige Namba, Tokyo (JP); Tomonori Shichida, Tokyo (JP); Naoto Kawase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 756 days.

(21) Appl. No.: 14/190,996

(22) Filed: Feb. 26, 2014

(65) Prior Publication Data

US 2014/0241482 A1    Aug. 28, 2014

(30) Foreign Application Priority Data

Feb. 27, 2013    (JP) ................. 2013-037608

(51) Int. Cl.
G21C 17/01        (2006.01)
G21C 17/013       (2006.01)
G21C 17/017       (2006.01)

(52) U.S. Cl.
CPC .......... *G21C 17/013* (2013.01); *G21C 17/01* (2013.01); *G21C 17/017* (2013.01)

(58) Field of Classification Search
USPC ........................................ 376/249
See application file for complete search history.

(56) References Cited

U.S. PATENT DOCUMENTS 3,901,073 A * 8/1975 Dent .............. G01N 29/265
                                                376/249
3,929,007 A * 12/1975 Dent .............. G01N 29/265
                                                376/249

(Continued)

FOREIGN PATENT DOCUMENTS

JP    07-218474 A    8/1995
JP    11-326285 A    11/1999

(Continued)

OTHER PUBLICATIONS

Office Action dated Nov. 22, 2016, issued in counterpart Japanese Application No. 2013-037608, with machine translation (6 pages).

(Continued)

*Primary Examiner* — Sean P Burke
(74) *Attorney, Agent, or Firm* — Westerman, Hattori, Daniels & Adrian, LLP

(57) ABSTRACT

There is provided an inspection device for inspecting an inner surface of a nozzle provided in a reactor vessel. The inspection device includes: a device frame, an inspection unit provided on the device frame, an inspection unit push-out moving mechanism for pushing out and moving the inspection unit to the inner surface of the nozzle, a rotation moving mechanism for rotating and moving the inspection unit, a calibration test unit arranged on the device frame for calibrating the inspection unit; and a calibration test unit forward/backward moving mechanism for moving the calibration test unit forward or backward in the direction along the central axis with regard to a track where the inspection unit makes push-out movement.

6 Claims, 19 Drawing Sheets

(56) References Cited

U.S. PATENT DOCUMENTS

| | | | | | |
|---|---|---|---|---|---|
| 3,934,457 | A | * | 1/1976 | Clark | G01N 29/265 |
| | | | | | 376/249 |
| 3,943,756 | A | * | 3/1976 | Aubert | G21C 17/01 |
| | | | | | 376/249 |
| 4,117,733 | A | * | 10/1978 | Gugel | G01N 29/265 |
| | | | | | 376/249 |
| 4,131,018 | A | * | 12/1978 | Muller | F16L 55/28 |
| | | | | | 324/220 |
| 5,319,683 | A | * | 6/1994 | Kurek | G01N 29/30 |
| | | | | | 376/245 |
| 2007/0223643 | A1 | * | 9/2007 | Yamane | G01M 5/0025 |
| | | | | | 376/249 |

FOREIGN PATENT DOCUMENTS

| | | | |
|---|---|---|---|
| JP | 2000-249783 | A | 9/2000 |
| JP | 2000-321255 | A | 11/2000 |
| JP | 3378500 | B | 2/2003 |
| JP | 3378500 | B2 | 2/2003 |
| JP | 2004-245754 | A | 9/2004 |
| JP | 2007-78350 | A | 3/2007 |
| JP | 2008-197087 | A | 8/2008 |
| JP | 4444168 | B2 | 3/2010 |

OTHER PUBLICATIONS

Office Action dated Jan. 31, 2017, issued in counterpart Japanese Application No. 2013-037608, with machine translation (4 pages).

* cited by examiner

INSPECTION METHOD AND INSPECTION DEVICE

CROSS-REFERENCE TO RELATED ART

This application is based upon and claims the benefit of priority from Japanese Patent Application No. 2013-037608 filed Feb. 27, 2013, the entire contents of which are incorporated herein by reference.

BACKGROUND OF THE INVENTION

1. Field of the Invention

The present invention relates to an inspection method and inspection device for inspecting the inner surface of a nozzle provided in a reactor vessel of a nuclear power plant.

2. Description of the Related Art

For example, a nuclear power plant having a pressurized water reactor (PWR) uses light water, which serves as primary cooling water, as a reactor coolant and neutron moderator, and makes it into a high-temperature and high-pressure water that does not boil throughout the reactor internal, and causes the high-temperature and high-pressure water to flow into a steam generator, so that steam is generated by heat exchange, and this steam is caused to flow into a turbine generator to generate power.

In such nuclear power plant, various kinds of structural objects in the pressurized water reactor are required to be inspected with a regular interval in order to ensure sufficient level of safety and reliability. When each inspection is carried out, and a defect is found, then the required portions related to the defect are repaired. For example, in the pressurized water reactor, the main body of the reactor vessel has an outlet nozzle for providing the primary cooling water to the steam generator and an inlet nozzle for retrieving the primary cooling water of which heat has been exchanged by the steam generator. These nozzles are connected, by means of welding, with the primary cooling water tube which is in communication with the steam generator. Since the nozzles and the primary cooling water tube are made of different materials, safe-end tubes are connected therebetween by means of welding.

With a cutting method and a cutting device for an inner surface of a nozzle of a reactor vessel as described in Patent Literature 1 (Japanese Patent No. 4444168), when a welded portion of the nozzle is determined to have defective surface such as crack due to secular change, a cutting device is inserted into the inside of the nozzle, and is positioned at a cutting position, and the cutting device cuts the welded portion. During the cutting process, the cutting position is determined with an eddy-current flaw detection sensor, and the inner surface shape of the nozzle is recorded with a displacement detection sensor, and the inner surface of the nozzle is cut on the basis of such data.

Patent Literature 1 indicates that the inner surface of the nozzle of the reactor vessel is repaired, and the device is hoisted by a crane and is inserted into the nozzle, and the cutting position is determined with the eddy-current flaw detection sensor. When the eddy-current flaw detection sensor is calibrated in such repairing method, the device is needed to be calibrated on a work floor of a nuclear reactor building of a nuclear power plant before the device is inserted into the inside of the nozzle, and thereafter, the device is needed to be hoisted by a crane and inserted into the inside of the nozzle, and the cutting position is determined with the eddy-current flaw detection sensor at that position, and thereafter, the device is needed to be hoisted by the crane to bring the device back to the work floor, and the device is needed to be calibrated. In this case, as described above, the reactor vessel forms a loop having the inlet nozzle and the outlet nozzle and connected to one steam generator. Alternatively, in a nuclear power plant having multiple steam generators, the reactor vessel includes multiple inlet nozzles and outlet nozzles so as to form as many loops as the number of steam generators. More specifically, it is necessary to perform the work for the multiple nozzles, which includes hoisting the device with a crane and inserting the device into the inside of the nozzle, and returning the device back to the work floor, and therefore, it takes a lot of time and the work efficiency may be reduced.

In an under-water eddy-current test device described in Patent Literature 2 (Japanese Laid-open Patent Publication No. 7-218474), a test coil and a normal coil are attached to an operation head that moves in the upper/lower vertical direction along a fixed fuel rod and that moves in the forward/backward direction and the horizontal direction perpendicular to the upper/lower vertical direction, and a sensitivity calibration test piece is provided in proximity thereto. During the measuring process, the test coil is pushed out to the forward position, and is brought into contact with the fuel rod. On the other hand, when the sensitivity of the test coil is calibrated before the measurement process, the sensitivity calibration test piece is fixed with respect to the horizontal direction movement of the operation head, and the test coil is moved in the horizontal direction, so that it is brought into contact with the sensitivity calibration test piece in a face to face manner.

An eddy-current inspection device for fuel cladding described in Patent Literature 3 (Japanese Patent No. 3378500) includes a chuck unit for holding a fuel cladding, a sensor holder unit for pushing an inspection sensor against the center of the fuel cladding so as to be perpendicular thereto, and a zero calibration test piece unit for an inspection sensor, wherein the zero calibration test piece unit includes a rotation mechanism, and during the calibration process, it is provided to be able to move to the forward side of the inspection sensor.

In Patent Literature 2 and Patent Literature 3, the calibration test piece is provided on the device, and therefore, the calibration can be performed in the under-water environment where the inspection is performed. However, in Patent Literature 2, during the measurement process, the test coil is pushed forward to be in contact with the fuel rod, and when the sensitivity of the test coil is calibrated, the test coil is moved in the horizontal direction, and is brought into contact with the sensitivity calibration test piece in a face to face manner. For this reason, the position of the test coil may be out of the position where it faces the fuel rod, and when each environment has changed, the calibration may not be performed accurately. In Patent Literature 3, the zero calibration test piece unit has the rotation mechanism and is arranged to be able to move to the forward side of the inspection sensor during the calibration process. Therefore, when the device is arranged at the position where the inspection is performed, the zero calibration test piece unit cannot be arranged at the forward side of the inspection sensor, and therefore, as a result, during the calibration process, the position of the device needs to be changed from the forward side of the fuel cladding, and the environment would be changed, which may make it impossible to accurately perform the calibration.

SUMMARY OF THE INVENTION

The present invention is to solve the above problems, and it is an object of the present invention to provide an inspection method and an inspection device capable of performing inspection and calibration without moving the device from the processed position.

According to a first aspect of the present invention, there is provided a

According to a second aspect of the present invention, there is provided an inspection method for inspecting an inner surface of a nozzle provided in a reactor vessel, the inspection method including: inserting an inspection device including an inspection unit and a calibration test unit into inside of the nozzle; subsequently moving the calibration test unit forward or backward with regard to a track where the inspection unit makes push-out movement to the inner surface of the nozzle at a reference position where the inspection device is inserted into the inside of the nozzle, and calibrating the inspection unit; and subsequently causing the inspection unit to inspect the inner surface of the nozzle.

According to a third aspect of the present invention, there is provided an inspection device for inspecting a body which is to be inspected, the body being provided in a nuclear power plant, the inspection device including: a device frame installed at the reference position for inspecting the body; an inspection unit provided on the device frame, for inspecting the inspection target portion of the body; an inspection unit push-out moving mechanism for pushing out and moving the inspection unit to the inspection target portion while the device frame is installed at the reference position; a calibration test unit provided on the device frame, for calibrating the inspection unit; and a calibration test unit forward/backward moving mechanism for moving the calibration test unit forward or backward with regard to a track where the inspection unit makes push-out movement in such a state that the inspection unit is installed at the reference position.

According to a fourth aspect of the present invention, there is provided an inspection device for inspecting an inner surface of a nozzle provided in a reactor vessel, the inspection device including: a device frame inserted into inside of the nozzle; an inspection unit provided on the device frame, for inspecting the inner surface of the nozzle; an inspection unit push-out moving mechanism for pushing out and moving the inspection unit to the inner surface of the nozzle while the device frame is installed in the inside of the nozzle; a rotation moving mechanism for rotating and moving the inspection unit about a predetermined central axis along a peripheral direction of the nozzle while the device frame is installed in the inside of the nozzle; a calibration test unit arranged on the device frame for calibrating the inspection unit; and a calibration test unit forward/backward moving mechanism for moving the calibration test unit forward or backward in the direction along the central axis with regard to a track where the inspection unit makes push-out movement.

DETAILED DESCRIPTION OF THE PREFERRED EMBODIMENTS

Hereinafter, an embodiment according to the present invention will be explained in detail with reference to drawings. It should be noted that this invention is not limited by the embodiment. Constituent elements in the embodiment include those that can be easily replaced by a person skilled in the art or those that are substantially the same.

Figure 1:
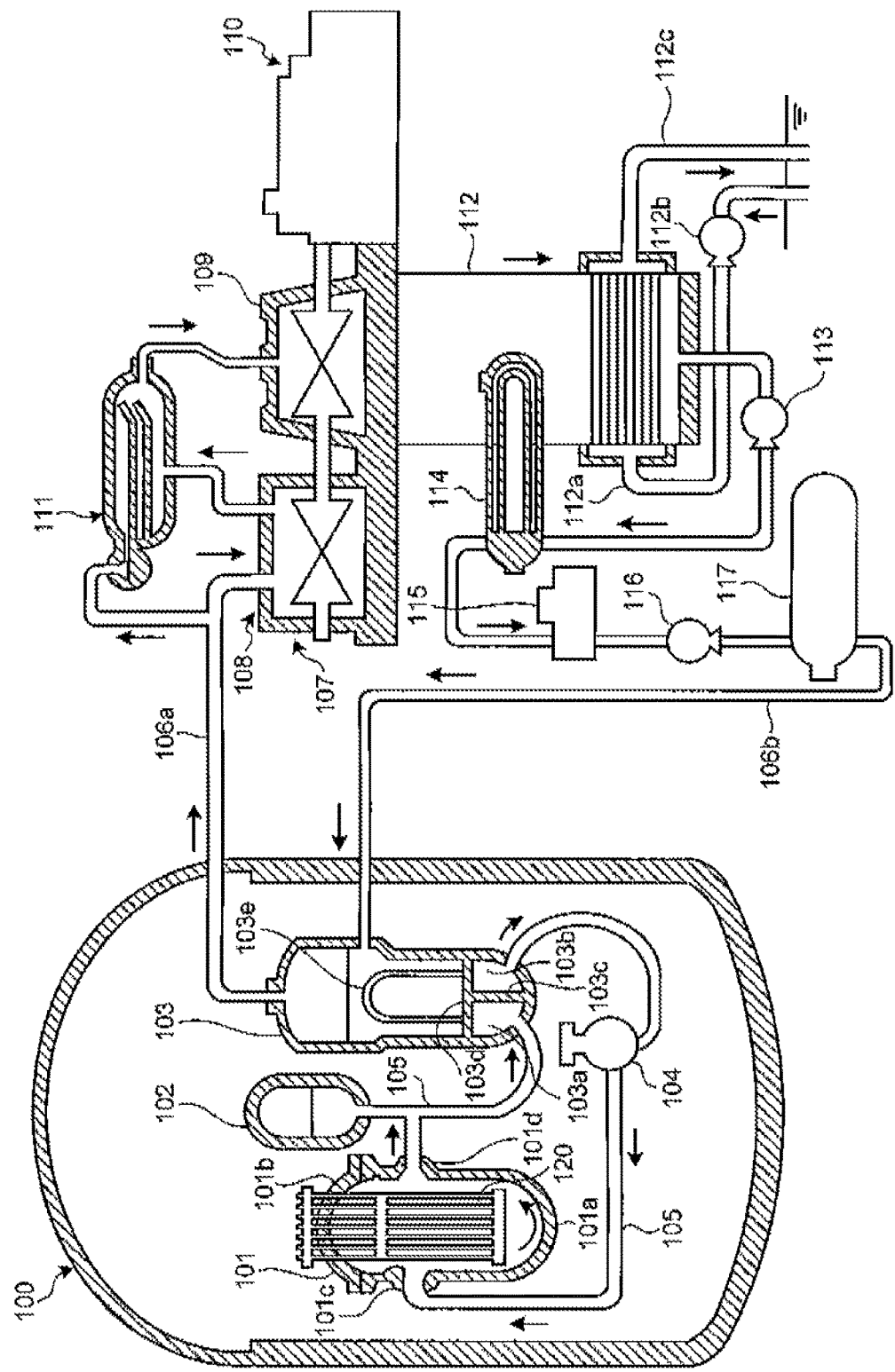
FIG. 1 is a schematic configuration diagram illustrating an example of a nuclear power plant.

FIG. 1 is a schematic configuration diagram illustrating an example of a nuclear power plant. The nuclear power plant as illustrated in FIG. 1 includes a pressurized water reactor (PWR). This nuclear power plant is configured such that a reactor vessel 101 for a pressurized water reactor, a pressurizing device 102, a steam generator 103, and a primary cooling water pump 104 in a reactor vessel 100 are connected in order by a primary cooling water tube 105, so that a circulation path for primary cooling water is made.

The reactor vessel 101 has a fuel assembly 120 contained therein in a sealed manner, and is constituted by a main body of a reactor vessel 101a and a reactor vessel lid 101b attached to the upper side thereof, so that the fuel assembly 120 can be inserted thereinto or removed therefrom. The main body of the reactor vessel 101a has an inlet nozzle 101c and an outlet nozzle 101d, which are provided at the upper side thereof, for feeding and discharging the light water serving as primary cooling water. The outlet nozzle 101d is connected to the primary cooling water tube 105 so as to be in communication with an inlet water chamber 103a of a steam generator 103. The inlet nozzle 101c is connected to the primary cooling water tube 105 so as to be in communication with an outlet water chamber 103b of the steam generator 103.

The steam generator 103 is provided in such a manner that, at the lower portion formed in a hemisphere shape, the inlet water chamber 103a and the outlet water chamber 103b are separated by a separation plate 103c. The inlet water chamber 103a and the outlet water chamber 103b are separated from the upper side of the steam generator 103 by a tube plate 103d provided at a ceiling portion thereof. At the upper side of the steam generator 103, a heat transmission tube 103e in an inverse U shape is provided. The end portions of the heat transmission tube 103e are supported by the tube plate 103d so as to connect the inlet water chamber 103a and the outlet water chamber 103b. The inlet water chamber 103a is connected to the primary cooling water tube 105 at the entrance side, and the outlet water chamber 103b is connected to the primary cooling water tube 105 at the outlet side. The steam generator 103 is configured such that the upper end of the upper side of the steam generator 103 separated by the tube plate 103d is connected to a secondary cooling water tube 106a at the outlet side, and the side portion of the upper side of the steam generator 103 is connected to a secondary cooling water tube 106b at the entrance side.

In the nuclear power plant, the steam generator 103 is connected, outside of the reactor vessel 100, to a steam turbine 107 via secondary cooling water tubes 106a, 106b, so that the circulation path for the secondary cooling water is made.

The steam turbine 107 includes a high pressure turbine 108 and a low pressure turbine 109, and is connected to an electric power generator 110. The high pressure turbine 108 and the low pressure turbine 109 are connected to a moisture separator reheater 111 which branches off from the secondary cooling water tube 106a. The low pressure turbine 109 is connected to a condenser 112. The condenser 112 is connected to a secondary cooling water tube 106b. As described above, the secondary cooling water tube 106b is connected to the steam generator 103, and the secondary cooling water tube 106b extends from the condenser 112 to the steam generator 103, and the secondary cooling water tube 106b includes a condenser pump 113, a low pressure feed heater 114, a deaerator 115, a main feed pump 116, and a high pressure feed heater 117.

Therefore, in the nuclear power plant, the primary cooling water is heated in the reactor vessel 101 to be of a high temperature and high pressure, and while it is pressurized by the pressurizing device 102 so that the pressure is maintained at a constant level, it is provided via the primary cooling water tube 105 to the steam generator 103. In the steam generator 103, heat is exchanged between the primary cooling water and the secondary cooling water, so that the secondary cooling water is evaporated to become steam. The primary cooling water having been cooled after the heat exchange is recovered by the primary cooling water pump 104 via the primary cooling water tube 105, and is returned back to the reactor vessel 101. On the other hand, the secondary cooling water which is made into steam as a result of the heat exchange is provided to the steam turbine 107. With regard to the steam turbine 107, the moisture separator reheater 111 removes moisture from the exhaust discharged from the high pressure turbine 108, and further heats it to make it into superheated state, and thereafter, feeds it into the low pressure turbine 109. The steam turbine 107 is driven by the steam of the secondary cooling water, and the force of the steam turbine 107 is transmitted to the electric power generator 110, so that the electric power is generated. The steam used for driving the turbine is discharged to the condenser 112. The condenser 112 exchanges heat between cooling water (for example, seawater) retrieved by a pump 112b via a water intake tube 112a and the steam discharged from the low pressure turbine 109, and the steam is condensed, so that it becomes back to saturated liquid of a low pressure. The cooling water used for the heat exchange is discharged from a discharge tube 112c. The saturated liquid which has been condensed becomes the secondary cooling water, and is pumped to the outside of the condenser 112 by the condenser pump 113 via the secondary cooling water tube 106b. Further, the secondary cooling water passing the secondary cooling water tube 106b is heated by the low pressure feed heater 114 with, for example, the low pressure steam bled from the low pressure turbine 109, and after the deaerator 115 removes impurities such as dissolved oxygen and non-condensable gas (ammonia gas), the secondary cooling water is fed by the main feed pump 116, and the high pressure feed heater 117 heats the secondary cooling water with, for example, high pressure steam bled from the high pressure turbine 108, and thereafter, high pressure steam is returned back to the steam generator 103.

In the pressurized water reactor of the nuclear power plant configured as described above, the reactor vessel 101 is configured such that the inlet nozzle 101c and the outlet nozzle 101d is connected to the primary cooling water tube 105 as described above. Since the inlet nozzle 101c and the outlet nozzle 101d and the primary cooling water tube 105 are made of different materials, a safe-end tube 121 is connected therebetween by welding (groove welded portion 122) (see FIG. 3 and FIG. 4).

For this reason, tensile stress may remain in the groove welded portion 122 and the peripheral portion thereof, and it is necessary to alleviate the stress. Therefore, a water jet peening device serving as a reactor repairing device alleviates the tensile residual stress on the inner surfaces of the nozzles 101c, 101d which are the groove welded portion 122 and the peripheral portion thereof, i.e., the target, thus making the tensile residual stress into compressive residual stress and preventing stress corrosion crack. This water jet peening device emits high pressure water including cavitation bubbles onto the surface of the metal member in the water, and alleviates the tensile residual stress of the surface of the metal member, thus making the tensile residual stress into the compressive residual stress.

When the water jet peening device alleviates the tensile residual stress on the inner surfaces of the nozzles 101c, 101d which are the groove welded portion 122 and the peripheral portion thereof and making the tensile residual stress into the compressive residual stress, work is performed by inserting this water jet peening device into the inside of the nozzles 101c, 101d. When the water jet peening is performed, the position to which the water jet is emitted is inspected in order to identify the position of the surface which is to be processed. In the present embodiment, the inspection device and the water jet peening device are integrally provided. It should be noted that the inspection device may be provided with any repairing device other than the water jet peening device.

Figure 2:
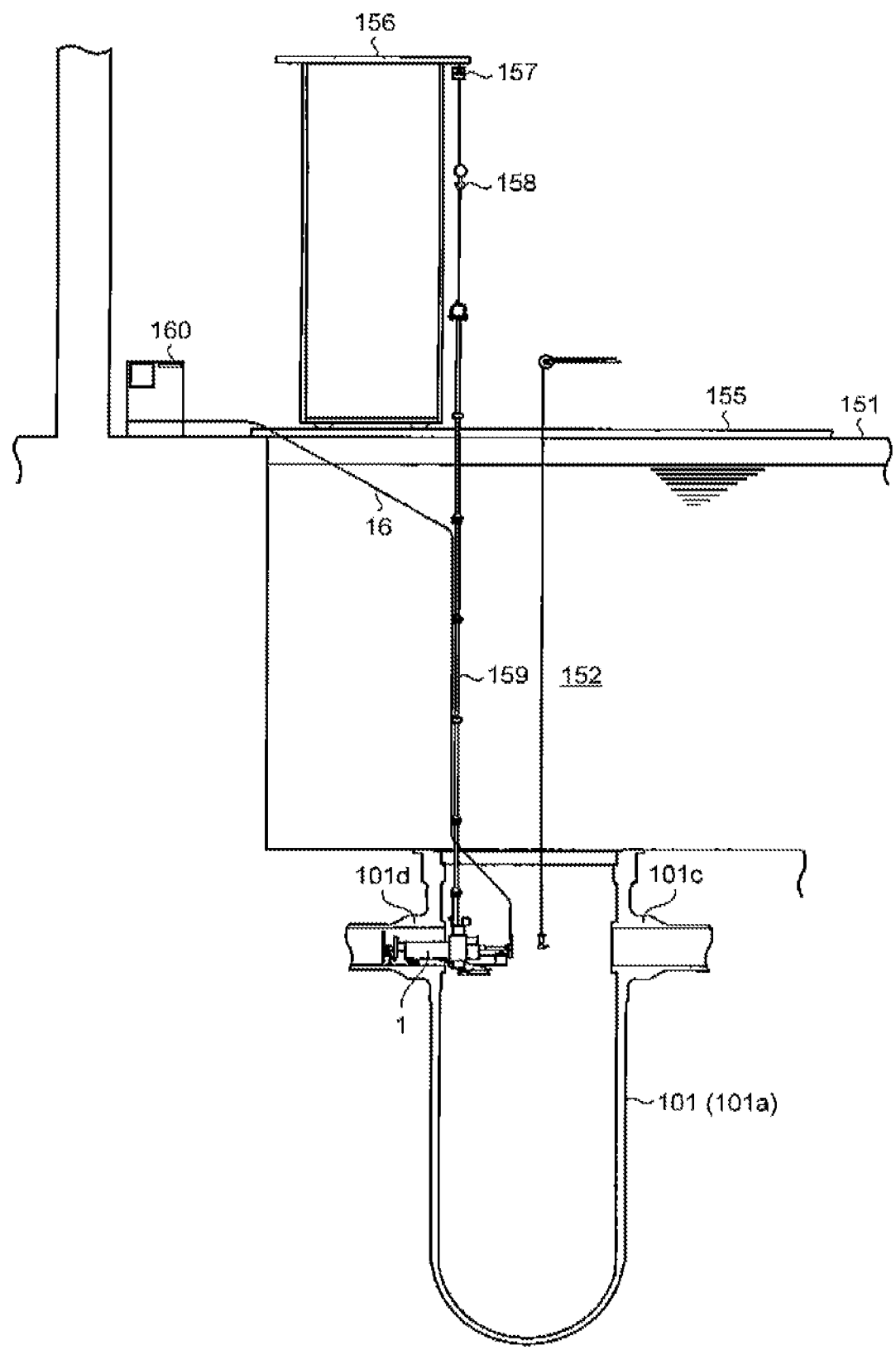
FIG. 2 is a schematic diagram illustrating the installation state of an inspection device according to an embodiment of the present invention.
Figure 3:
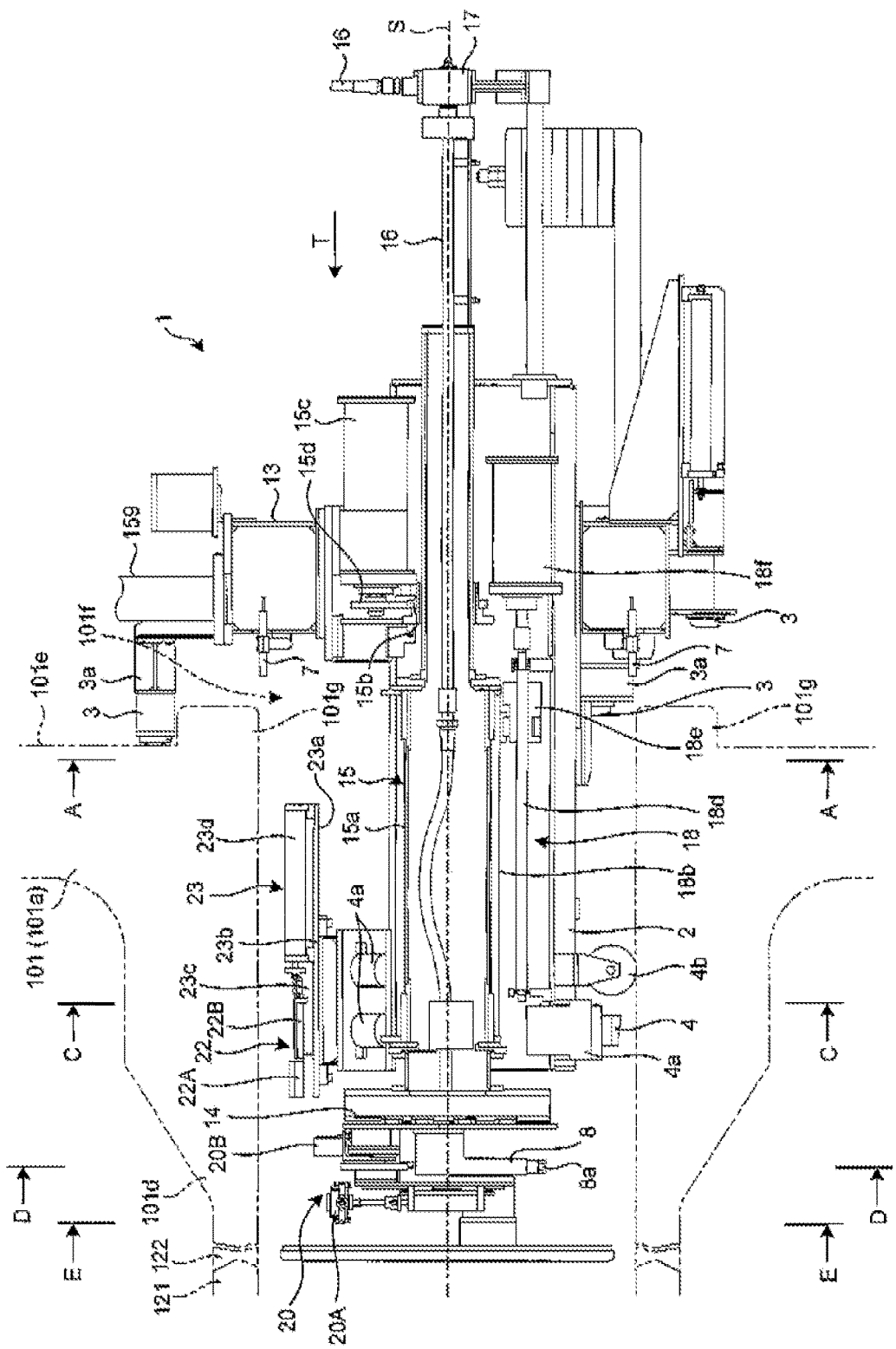
FIG. 3 is a sectional side view illustrating the inspection device according to an embodiment of the present invention.
Figure 4:
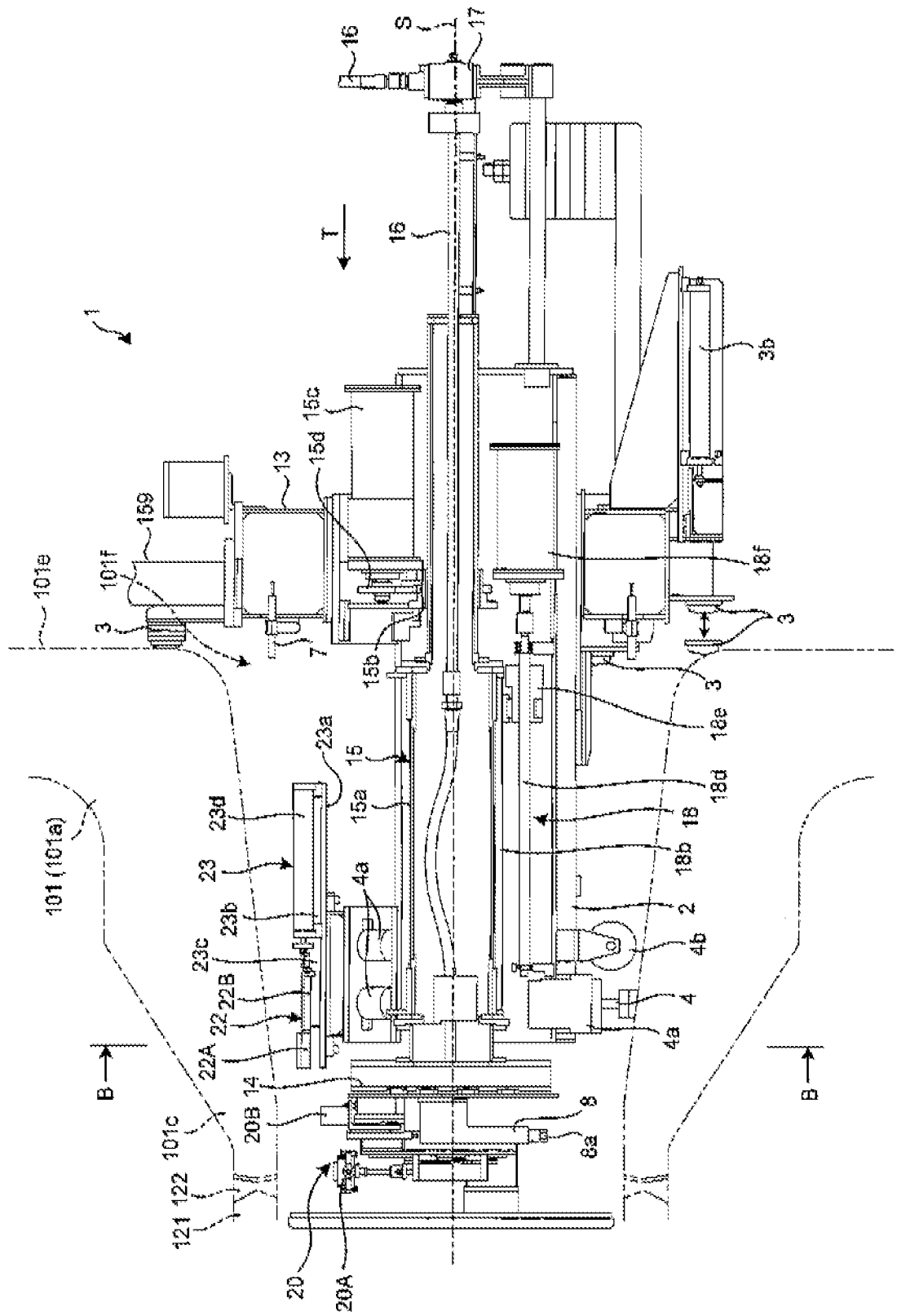
FIG. 4 is a sectional side view illustrating another usage form of the inspection device according to an embodiment of the present invention.
Figure 5:
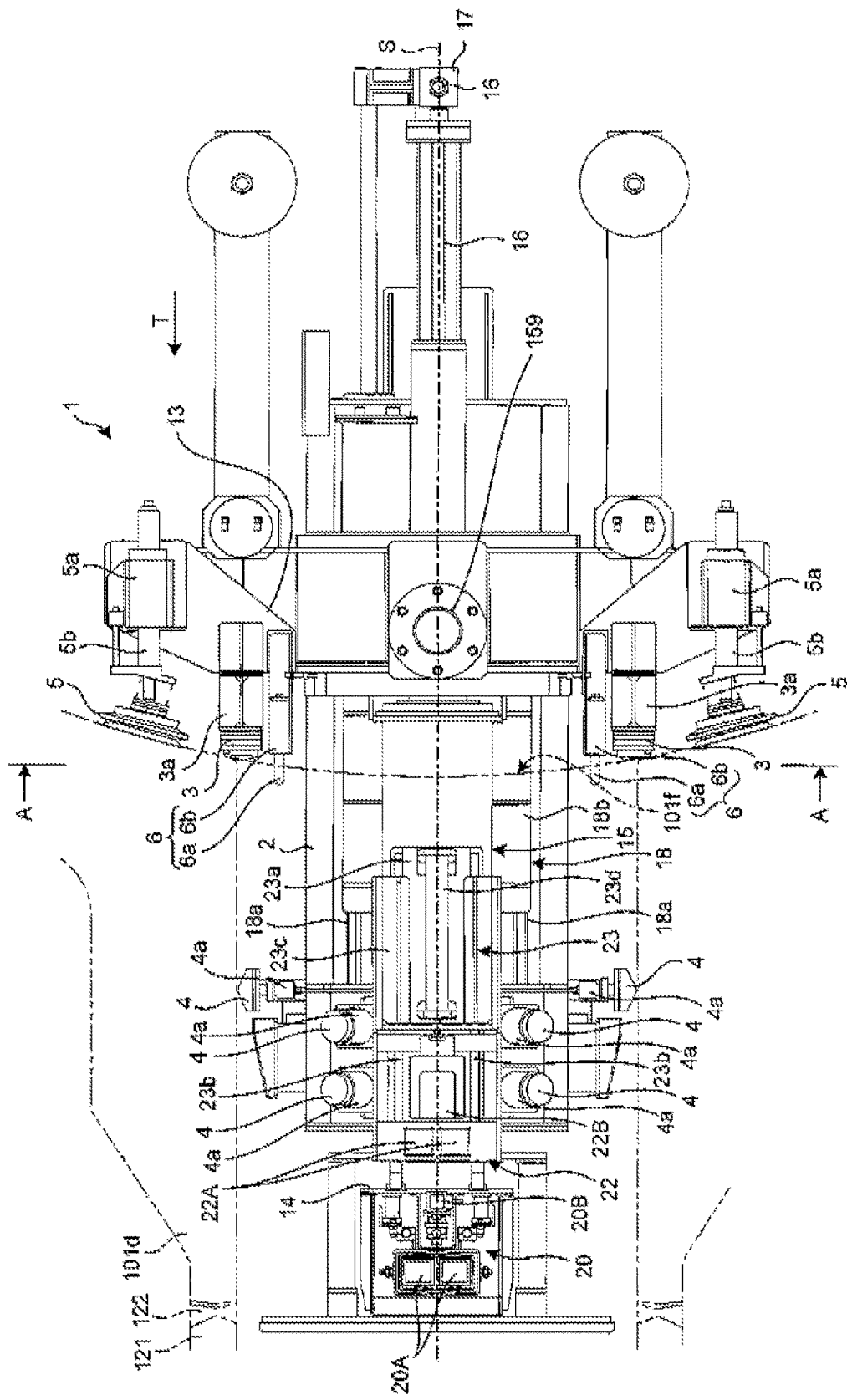
FIG. 5 is a top view illustrating the inspection device according to an embodiment of the present invention.
Figure 6:
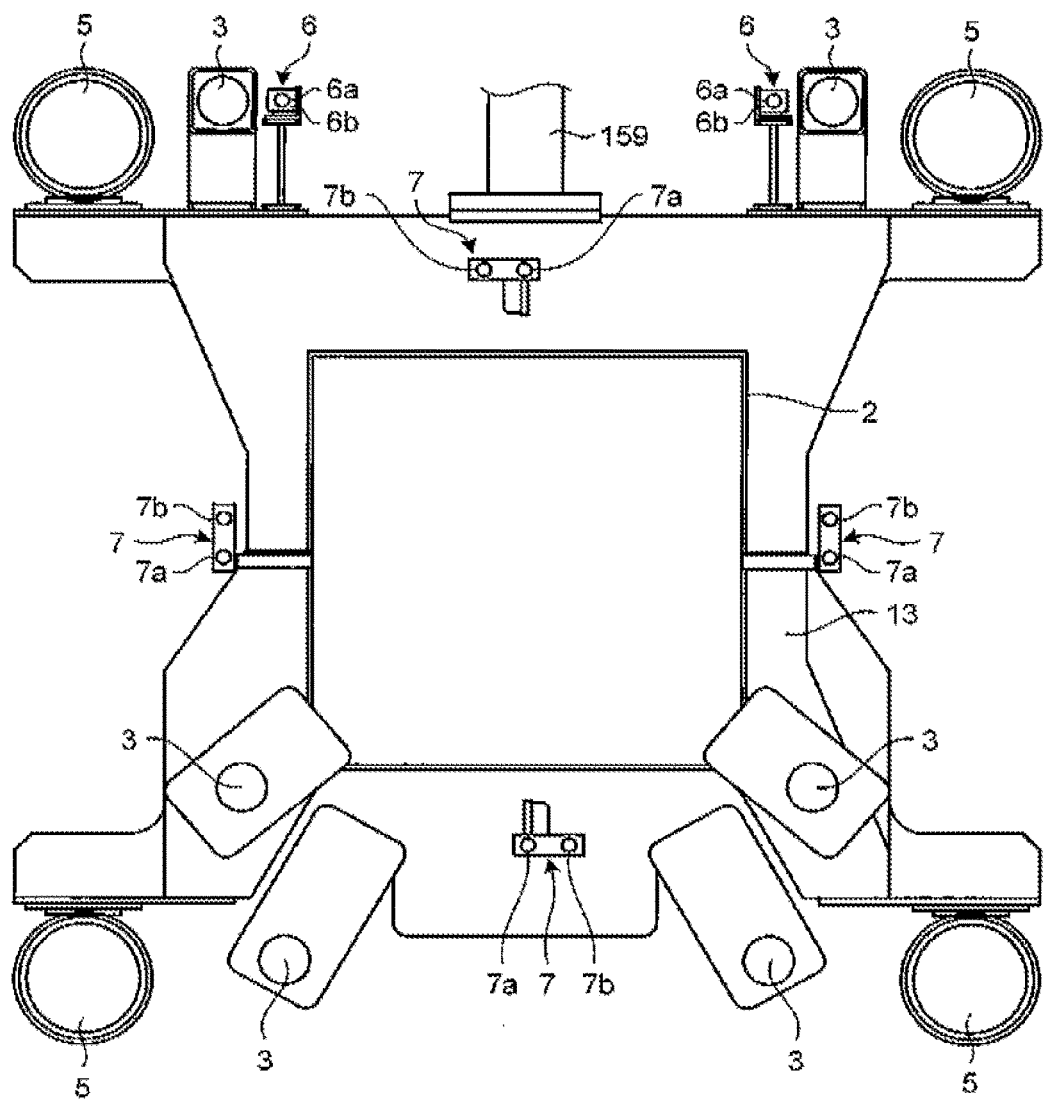
FIG. 6 is a sectional view taken along A-A of FIG. 3 and FIG. 5.
Figure 7:
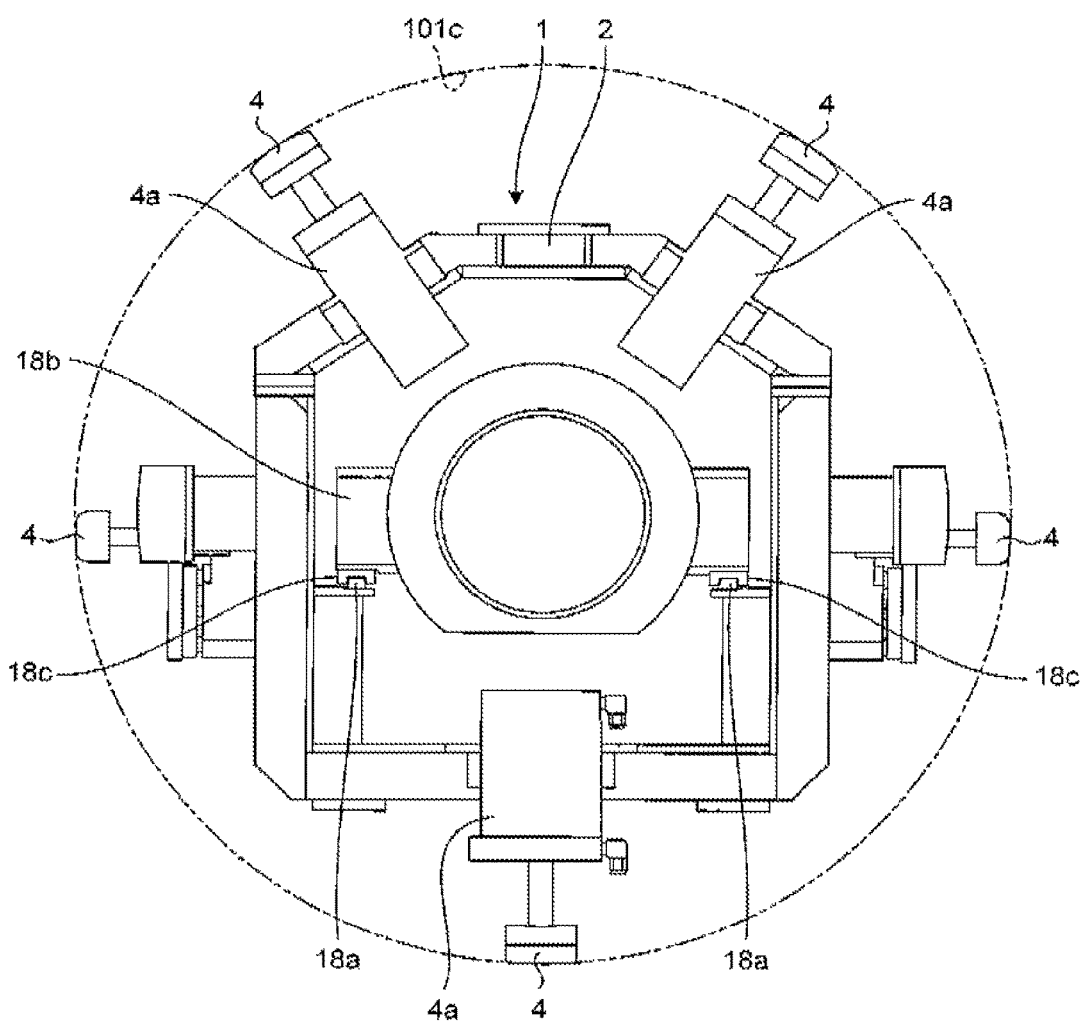
FIG. 7 is a sectional view taken along B-B of FIG. 4.
Figure 8:
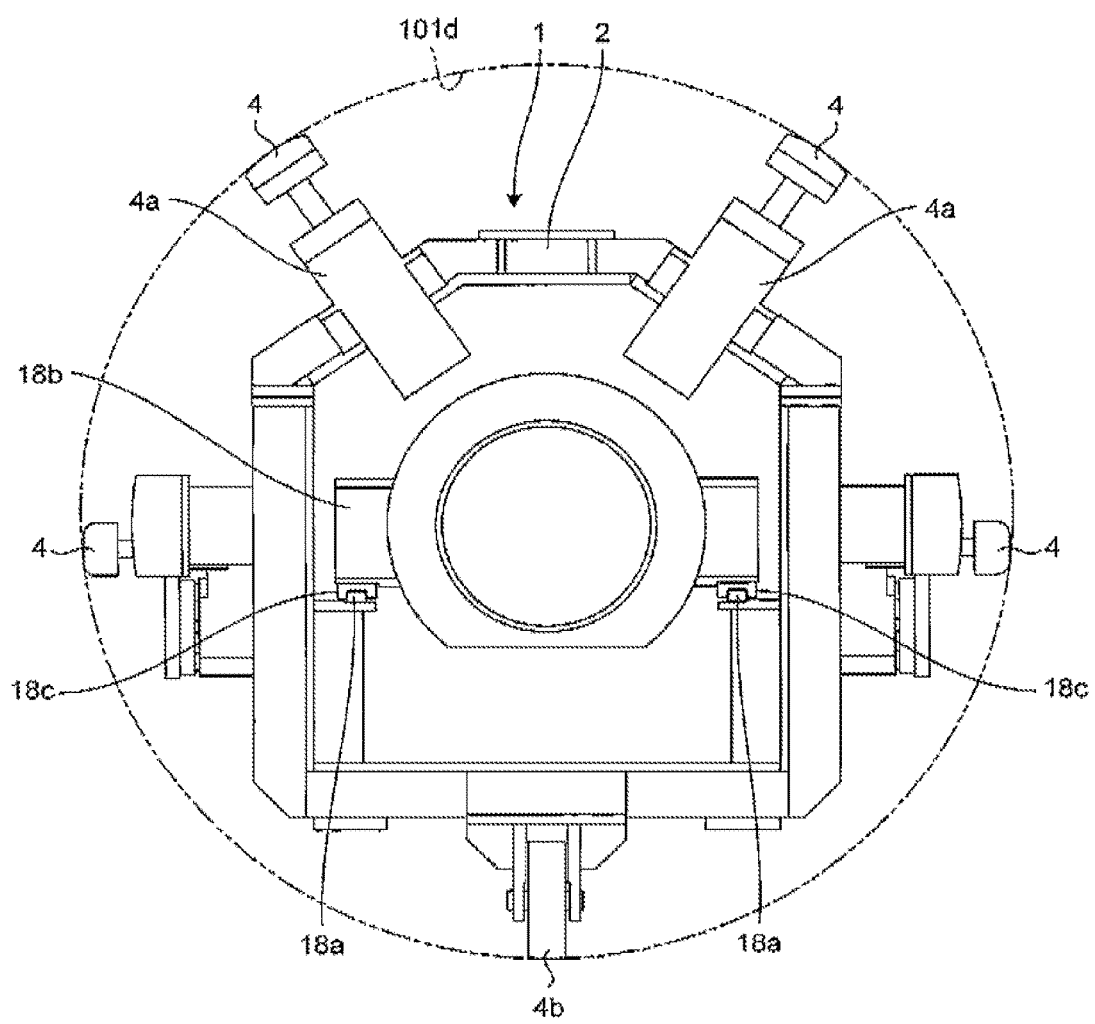
FIG. 8 is a sectional view taken along C-C of FIG. 3.
Figure 9:
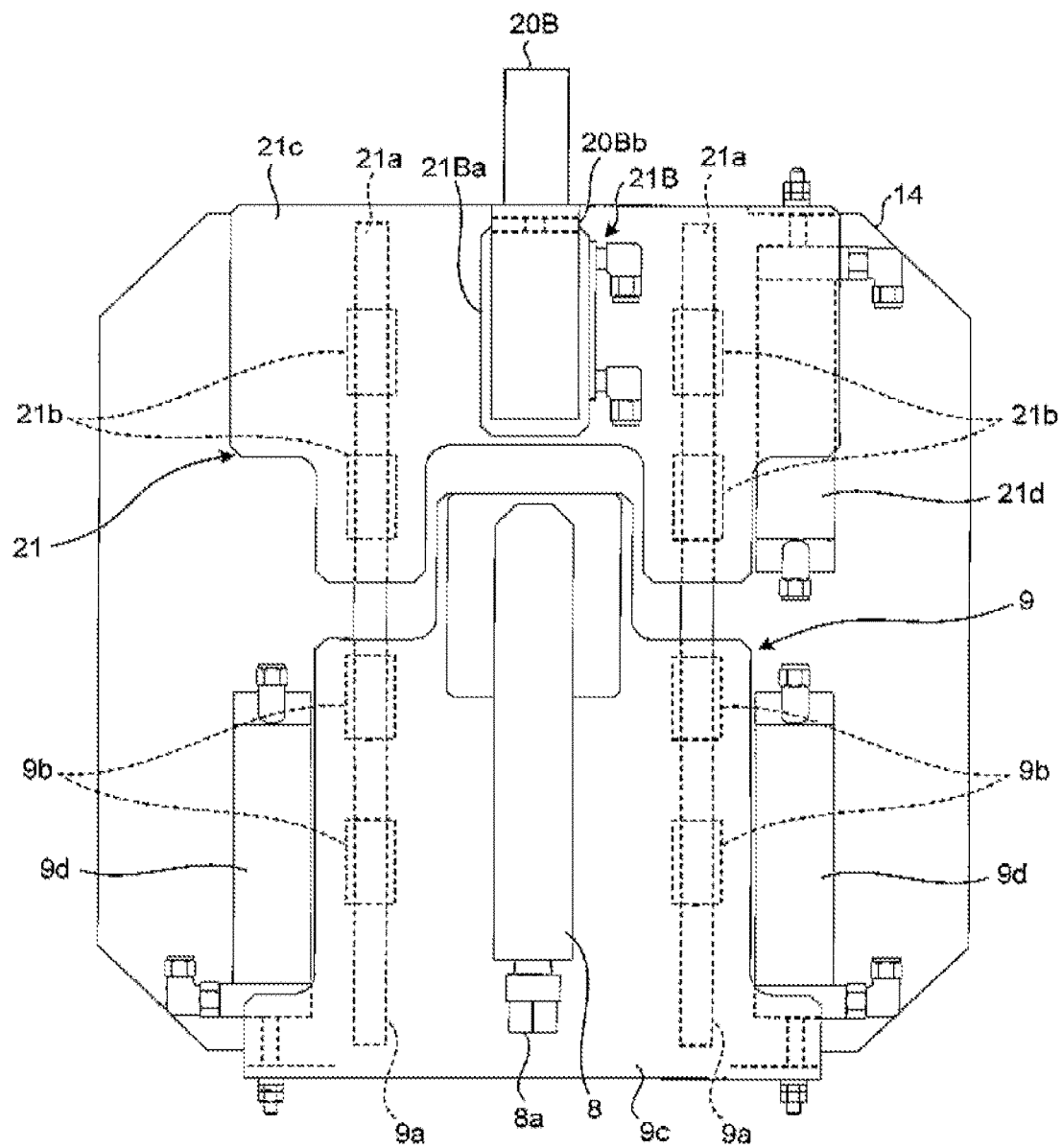
FIG. 9 is a view taken along D-D of FIG. 3.
Figure 10:
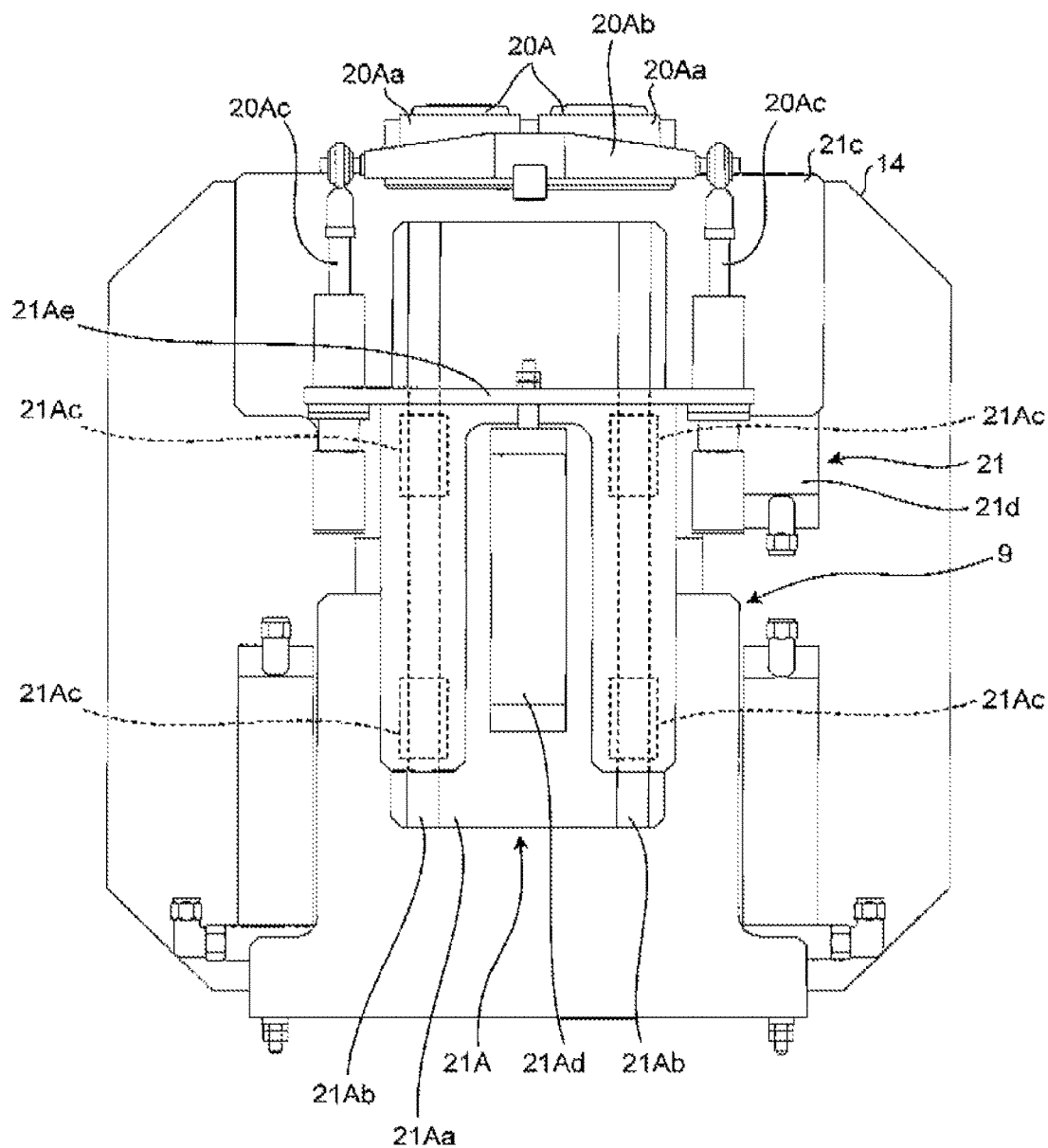
FIG. 10 is a view taken along E-E of FIG. 3.

FIG. 2 is a schematic diagram illustrating installation state of the inspection device according to the present embodiment. FIG. 3 is a sectional side view illustrating the inspection device according to the present embodiment. FIG. 4 is a sectional side view illustrating another usage form of the inspection device according to the present embodiment. FIG. 5 is a top view illustrating the inspection device according to the present embodiment. FIG. 6 is a sectional view taken along A-A of FIG. 3 and FIG. 5. FIG. 7 is a sectional view taken along B-B of FIG. 4. FIG. 8 is a sectional view taken along C-C of FIG. 3. FIG. 9 is a view taken along D-D of FIG. 3. FIG. 10 is a view taken along E-E of FIG. 3. FIGS. 11 to 15 are schematic views illustrating inspection procedure with the inspection device according to the present embodiment.

As illustrated in FIG. 2, an inspection device (water jet peening device) 1 is installed upon being inserted into the inside of the inlet nozzle 101c or the outlet nozzle 101d of the reactor vessel 101 (the main body of the reactor vessel 101a) which is the body which is to be inspected. In the present embodiment, the inlet nozzle 101c and the outlet nozzle 101d are examples of bodies which are to be inspected by the inspection device, but the bodies which are to be inspected by the inspection device are not limited thereto.

In the nuclear power plant, a nuclear reactor building (not shown) is provided with a work floor 151, and a cavity 152 is provided below the work floor 151, and cooling water is accumulated in the cavity 152. The cavity 152 has the reactor vessel 101 provided therein, and the reactor vessel 101 is suspended and supported. In the nuclear reactor building, a pair of guide rails 155 which are parallel to both sides of the cavity 152 are installed, and a mobile crane 156 is supported by the guide rails 155 in a movable manner. The mobile crane 156 is provided with an electric hoist 157 that can move in one direction in the horizontal direction (the horizontal direction in FIG. 2) and that can move in the other direction crossing (perpendicular to) the one direction in the horizontal direction (direction perpendicular to FIG. 2). This electric hoist 157 has a hook 158 that can ascend and descend along the vertical direction. An installation pole 159 is suspended via this hook 158.

The installation pole 159 is a long-length member that has a predetermined length, and the lower end portion of the installation pole 159 can be connected to the inspection device 1. This installation pole 159 is constituted by multiple divided poles, and both of them can be fastened with multiple swing bolts by bringing the flange units of the upper and lower ends thereof into contact with each other.

As illustrated in FIGS. 3 to 5, the nozzles 101c, 101d have an opening portion 101f in a wall surface 101e which is inside of the reactor vessel 101, and is arranged to extend in the horizontal direction (or including some component of the horizontal direction). The inspection device 1 is inserted from the opening portion 101f into the inside of the nozzles 101c, 101d and installed there. In the present embodiment, the installation pole 159 is used as an installation jig used for installing the inspection device 1, but the configuration is not limited thereto. For example, wires, cables, ropes, and the like may be used.

This inspection device 1 has a device frame 2 coupled with the installation pole 159. The device frame 2 has such an external shape that can be inserted into the inside of the nozzles 101c, 101d, and is formed to have a cylindrical shape extending along the insertion direction T. The device frame 2 mainly includes external abutment members 3, an internal abutment member 4, a suction unit 5, an abutment detection unit 6, an image-capturing unit 7, an injection nozzle 8, a nozzle push-out moving mechanism 9, a rotation moving mechanism 15, a slide moving mechanism 18, an inspection unit 20, an inspection unit push-out moving mechanism 21, a calibration test unit 22, and a calibration test unit forward/backward moving mechanism 23.

As illustrated in FIGS. 3 to 5, the external abutment member 3 comes into contact with the wall surface 101e when the device frame 2 is inserted into a predetermined position in the inside of the nozzles 101c, 101d. As illustrated in FIGS. 3 to 6, the external abutment member 3 is attached to a support member 13 fixed in an extending manner to the outside of the device frame 2, and the external abutment member 3 is attached so that the front end of the external abutment member 3 faces the front end side at which the device frame 2 is inserted (in the insertion direction T) in a protruding manner. In the present embodiment, two external abutment members 3 are provided at the upper side of the support member 13 in such a manner that each one of the two external abutment members 3 is arranged at the right and the left, and four external abutment members 3 are provided at the lower side of the support member 13 in such a manner that two external abutment members 3 are arranged at each of the right and the left, which means that there are totally six external abutment members 3 provided.

As illustrated in FIGS. 3 and 5, by providing spacers 3a or not providing the spacers 3a, the upper two external abutment members 3 and the slightly upper two of the lower external abutment members 3 are configured to be able to change the position of the front end to the front end side at which the device frame 2 is inserted. As illustrated in FIGS. 3 to 5, the slightly lower two of the lower external abutment members 3 are configured to be movable so that the position of the front end to the front end side at which the device frame 2 is inserted can be changed by an actuator (air pressure cylinder) 3b. This is because the shapes of the opening portions 101f of the inlet nozzle 101c and the outlet nozzle 101d are different, and the outlet nozzle 101d is formed with a protrusion 101g, and the slightly lower two of the lower external abutment members 3 are thus configured to be able to cope with the presence of the protrusion 101g and the absence of the protrusion 101g.

As described above, the external abutment members 3 are provided, thus being able to determine the position in the state where the device frame 2 is inserted into the predetermined position inside of the nozzles 101c, 101d.

As illustrated in FIGS. 3 to 5, 7, and 8, the internal abutment member 4 is a portion where the device frame 2 is inserted into the inside of the nozzles 101c, 101d. The internal abutment members 4 are provided at multiple positions around the device frame 2 (central axis S), and the internal abutment members 4 are provided to protrude so that the front end faces the outside in the radial direction. As illustrated in FIG. 5, in the present embodiment, four internal abutment members 4 are provided at the right and the left of the upper side with respect to the center of the device frame 2 in such a manner that two internal abutment members 4 are each arranged at the front and the back in the insertion direction T of the device frame 2, and two internal abutment members 4 are provided in such a manner that each one of the two internal abutment members 4 is arranged at either side of the device frame 2 at a height close to the central position, and as illustrated in FIGS. 4 and 7, one internal abutment member 4 is provided at the lower side of the central position of the device frame 2, which means that there are totally seven internal abutment members 4 provided. These internal abutment members 4 are configured to be able to move forward and backward in the radius direction about the device frame 2 by an actuator (air pressure cylinder) 4a. The internal abutment member 4 moved forward by the actuator 4a comes into contact with the inner surfaces of the nozzles 101c, 101d.

As illustrated in FIGS. 4 and 7, the internal abutment member 4 provided at the lower side of the central position of the device frame 2 is located below the two internal abutment members 4 arranged at the front in the insertion direction T of the device frame 2 which are provided at each of the right and the left at the upper side, and when inserted into the inlet nozzle 101c with the five portions including the two internal abutment members 4 arranged at both sides at the height close to the central position of the device frame 2, the internal abutment member 4 provided at the lower side of the central position of the device frame 2 is used so that the central position of the device frame 2 is aligned with the central position of the inlet nozzle 101c. On the other hand, as illustrated in FIGS. 3 and 8, at the back side of the internal abutment member 4 at the lower side of the central position of the device frame 2, a tire 4b rotating in the insertion direction T is provided at the internal abutment member 4 that does not move forward or backward. This tire 4b located below the two internal abutment members 4 at the rear in the insertion direction T of the device frame 2 which are provided at the right and the left of the upper side, and when inserted into the outlet nozzle 101d with the five portions including the two internal abutment members 4 arranged at both sides at the height close to the central position of the device frame 2, this tire 4b is used so that the central position of the device frame 2 is aligned with the central position of the outlet nozzle 101d. This is because the shape of the hole of the inlet nozzle 101c and the shape of the hole of the outlet nozzle 101d are different, and an inclination is formed on the inner surface of the inlet nozzle 101c so that the diameter becomes smaller in the inside, but the outlet nozzle 101d does not have this inclination, and the central position of the device frame 2 is aligned with the central position of the nozzles 101c, 101d in accordance with the presence of this inclination or the absence of this inclination.

As described above, since the internal abutment members 4 are provided, the central position of the device frame 2 can be aligned with the central position of the nozzles 101c, 101d.

As illustrated in FIG. 5, the suction unit 5 is provided so that the suction unit 5 can be adhered to the wall surface 101e when the device frame 2 is inserted into the predetermined position inside of the nozzles 101c, 101d. As illustrated in FIGS. 5 and 6, the suction unit 5 is attached to the support member 13 in such a manner that the suction surface faces the front end side to which the device frame 2 is inserted (insertion direction T). In the present embodiment, two suction units 5 are provided in such a manner that each of the two suction units 5 is arranged at the right and the left of the upper side of the support member 13, and two suction units 5 are provided in such a manner that each of the two suction units 5 is arranged at the right and the left of the lower side of the support member 13, which means that there are totally four suction units 5 provided. As illustrated in FIG. 5, the suction unit 5 is provided to be able to move along the insertion direction T by an actuator (air pressure cylinder) 5a. As illustrated in FIG. 5, the suction unit 5 is arranged to be able to swing in the right and left direction with respect to a rod 5b of the actuator 5a so as to cope with the inclination of the wall surface 101e.

As described above, since the suction unit 5 is provided, the device frame 2 can be maintained in such a state that the device frame 2 inserted into the inside of the nozzles 101c, 101d is positioned by the external abutment members 3, and the device frame 2 can be maintained in such a state that the central position of the device frame 2 is aligned with the central position of the nozzles 101c, 101d by the internal abutment members 4.

As illustrated in FIG. 5, when the external abutment member 3 comes into contact with the wall surface 101e, the abutment detection unit 6 detects this. As illustrated in FIGS. 5 and 6, the abutment detection unit 6 is arranged at the side portion of the upper external abutment member 3 with respect to the support member 13, and is attached in such a manner that the front end of a contact shoe 6a faces the front end side to which the device frame 2 is inserted (insertion direction T). The contact shoe 6a is provided to be able to move along the insertion direction T with respect to a casing 6b, and is urged by a spring (not shown) so as to protrude in the insertion direction T at all times. The casing 6b has a proximity sensor (not shown) provided therein, and when the contact shoe 6a moves in a direction opposite to the insertion direction T, the proximity sensor detects the contact shoe 6a thus moved. The abutment detection unit 6 is configured such that, when the external abutment member 3 comes into contact with the wall surface 101e, the contact shoe 6a comes into abutment with the wall surface 10e at the same time and moves in the direction opposite to the insertion direction T, and this is detected by the proximity sensor, and the abutment detection unit 6 detects this as the abutment of the external abutment member 3 onto the wall surface 101e.

As described above, since the abutment detection unit 6 is provided, the state of abutment of the external abutment member 3 onto the wall surface 101e can be recognized. More specifically, the fact that the device frame 2 inserted into the inside of the nozzles 101c, 101d is positioned by the external abutment members 3 can be recognized.

As illustrated in FIGS. 3, 4 and 6, totally four image-capturing units 7 are provided on the support member 13 in such a manner that each one of the four image-capturing units 7 is arranged at the upper side, the lower side, the left, and the right of the device frame 2. The image-capturing unit 7 includes a camera 7a and an illumination 7b, and each is arranged to face the front end side to which the device frame 2 is inserted (insertion direction T). This image-capturing unit 7 captures, from the rear end side from which the device frame is inserted, an image of the front end side to which the device frame 2 is inserted into the nozzles 101c, 101d.

As described above, since the image-capturing unit 7 is provided, the state of the device frame 2 inserted into the nozzles 101c, 101d can be monitored.

Therefore, when the device frame 2 is inserted into the nozzles 101c, 101d, such work is done while a video taken by the image-capturing unit 7 is watched on a monitor (not shown) provided on the work floor 151, and when a detection signal of the abutment detection unit 6 is input, it is recognized that the external abutment member 3 comes into contact with the wall surface 101e. Thereafter, the internal abutment members 4 are brought into contact with the inner surfaces of the nozzles 101c, 101d, and the suction unit 5 is adhered to the wall surface 101e of the nozzles 101c, 101d.

The injection nozzle 8 emits water jet onto the inner surfaces of the nozzles 101c, 101d. As illustrated in FIGS. 3, 4 and 9, the injection nozzle 8 is arranged on the support unit 14 provided at the front end side to which the device frame 2 is inserted, so that an injection port 8a emitting the water jet faces the inner surfaces of the nozzles 101c, 101d.

As illustrated in FIGS. 3 and 4, the support unit 14 is supported on the device frame 2 so as to be able to rotate about the central axis S (the central axis of the nozzles 101c, 101d) of the device frame 2. More specifically, the support unit 14 is supported by the rotation moving mechanism 15. The rotation moving mechanism 15 has a rotation shaft unit 15a. This rotation shaft unit 15a is attached to the support unit 14, and is supported by the device frame 2 so as to be able to rotate about the central axis S. The rotation shaft unit 15a is formed in a cylindrical shape extending along the central axis S, and a driven gear wheel 15b is attached to the external periphery thereof. The driven gear wheel 15b meshes with a driving gear wheel 15d provided on the output shaft of a rotation motor 15c fixed to the device frame 2. The rotation moving mechanism 15 rotates the rotation shaft unit 15a when the rotation of the driving gear wheel 15d is transmitted to the driven gear wheel 15b thanks to the rotation motor 15c driving. Therefore, the support unit 14 supported by the rotation shaft unit 15a rotates with the injection nozzle 8. As a result, the injection nozzle 8 rotates and moves along a predetermined movement track about the central axis S.

As described above, the injection nozzle 8 is provided the support unit 14 so that the injection port 8a emitting water jet faces the inner surfaces of the nozzles 101c, 101d. Therefore, the injection nozzle 8 rotated and moved by the rotation moving mechanism 15 rotates and moves along the predetermined movement track along the peripheral direction of the nozzles 101c, 101d while the injection port 8a faces the inner surfaces of the nozzles 101c, 101d. More specifically, when the rotation angle in the vertically downward direction is zero degrees, the direction of the injection port 8a of the injection nozzle 8 passes a rotation angle of 180 degrees in the vertically upward direction, and rotates 360 degrees along the peripheral direction of the nozzles 101c, 101d. The movement position of the injection port 8a and the inspection unit 20 explained later (flaw detection sensor 20A and image-capturing sensor 20B) in this movement track are detected by a nozzle position detection unit (not shown) provided in the rotation moving mechanism 15. In the present embodiment, the nozzle position detection unit is such that the rotation motor 15c is configured as the servo motor, and therefore, the movement position of the injection port 8a and the inspection unit 20 (the flaw detection sensor 20A and the image-capturing sensor 20B) along the movement track is detected.

As illustrated in FIGS. 3 and 4, in the rotation moving mechanism 15 explained above, a high pressure water providing tube 16 for providing high pressure water to the injection nozzle 8 is arranged inside of the rotation shaft unit 15a. This high pressure water providing tube 16 is provided in the rotation shaft unit 15a to extend along the central axis S from the rear end side from which the device frame 2 is inserted, and a swivel bearing 17 is interposed at the extension end portion thereof. The high pressure water providing tube 16 extends from the swivel bearing 17 to the upper side, and as illustrated in FIG. 2, the high pressure water providing tube 16 is connected to a high pressure water pump 160 for feeding the high pressure water installed on the work floor 151. More specifically, the high pressure water fed by the high pressure water pump 160 passes the high pressure water providing tube 16, and is provided to the injection nozzle 8, and the high pressure water is emitted as water jet from the injection port 8a to the inner surfaces of the nozzles 101c, 101d. Then, the injection nozzle 8 is rotated about the central axis S by the rotation moving mechanism 15, so that the water jet is emitted onto the inner surface along the peripheral direction of the nozzles 101c, 101d. When the rotation shaft unit 15a is rotated by the rotation moving mechanism 15, the high pressure water providing tube 16 provided therein also rotates therewith, but since the swivel bearing 17 is interposed therein, this can prevent the high pressure water providing tube 16 from being kinked.

As illustrated in FIGS. 3 and 4, the support unit 14 is supported on the device frame 2 so as to be able to slide and move along the central axis S of the device frame 2 (the central axis of the nozzles 101c, 101d). More specifically, the support unit 14 is supported by the slide moving mechanism 18 provided inside of the device frame 2. As illustrated in FIGS. 3 to 5, 7, and 8, the slide moving mechanism 18 includes a slide rail 18a, a slide base 18b, a slider 18c, a ball screw 18d, a nut unit 18e, and a slide motor 18f. The slide rails 18a extend in parallel to the central axis S of the device frame 2, and the pair of slide rails 18a are provided at the right and the left. The slide base 18b is supported by the slide rail 18a in such a manner that the slide base 18b can move in the direction in which the slide rail 18a extends. The slider 18c is attached via the slide rail 18a, and is fixed to the slide base 18b. The ball screw 18d is provided to extend along the central axis S of the device frame 2 in parallel to the slide rail 18a, and is supported on the device frame 2 to be able to rotate about the center of an axis parallel to the central axis S. The nut unit 18e is screwed to this ball screw 18d. The slide motor 18f is coupled with the ball screw 18d, and the ball screw 18d is rotated. The slide moving mechanism 18 drives the slide motor 18f to rotate the ball screw 18d, whereby the nut unit 18e as well as the slider 18c move in the direction in which the ball screw 18d extends (the direction parallel to the central axis S) with the slide base 18b. This slide base 18b is attached to the rotation shaft unit 15a of the rotation moving mechanism 15 described above supporting the support unit 14. More specifically, the rotation shaft unit 15a moves in the direction parallel to the central axis S together with the slide base 18b and with the support unit 14 supporting the injection nozzle 8. As a result, the injection nozzle 8 slides and moves along the central axis S.

By the way, as described above, the rotation shaft unit 15a rotates about the central axis S, and is attached in such a manner as to allow rotation with respect to the slide base 18b. The rotation shaft unit 15a is provided in such a manner that the driven gear wheel 15b can move along the central axis S. The driven gear wheel 15b is restricted from moving along the central axis S while meshing with the driving gear wheel 15d is maintained. For this reason, the transmission of driving for rotating the rotation shaft unit 15a is maintained at all time when the slide moving mechanism 18 slides and moves the rotation shaft unit 15a. More specifically, the rotation shaft unit 15a is provided to be able to rotate itself and slide and move along the central axis S.

The nozzle push-out moving mechanism 9 is to push out and move the injection nozzle 8 along the direction in which the water jet is emitted from the injection port 8a. As illustrated in FIG. 9, the nozzle push-out moving mechanism 9 is provided on the support unit 14, and includes slide rails 9a, sliders 9b, a slide base 9c, and actuators 9d. The pair of slide rails 9a are provided to extend in the direction perpendicular to the central axis S. The slider 9b is supported so as to be able to move in the direction in which the slide rails 9a extend. The slide base 9c is supported by the sliders 9b, and is provided to be able to move in the direction in which the slide rails 9a extend. The injection nozzle 8 is fixed to the slide base 9c in such a manner that the injection port 8a is in the direction in which the slide rails 9a extend. The actuators 9d are provided on the support unit 14 so that the actuators 9d are arranged on the slide rails 9a, respectively, and the actuators 9d are coupled with the slide base 9c. The actuators 9d are to move the slide base 9c in the direction in which the slide rails 9a extend, and in the present embodiment, the actuator 9d is made of an air pressure cylinder. However, the actuator 9d is not limited to the air pressure cylinder. Anything may be employed as long as it moves the slide base 9c in the direction in which the slide rails 9a extend. The nozzle push-out moving mechanism 9 drives the actuators 9d to move the slide base 9c with the injection nozzle 8 in the direction perpendicular to the central axis S. More specifically, the nozzle push-out moving mechanism 9 pushes out and moves the injection port 8a of the injection nozzle 8 so as to bring the injection port 8a of the injection nozzle 8 close to the inner surfaces of the nozzles 101c, 101d or move the injection port 8a of the injection nozzle 8 away from the inner surfaces of the nozzles 101c, 101d in such a state that the injection port 8a of the injection nozzle 8 faces the inner surfaces of the nozzles 101c, 101d. As a result, the emission distance of the water jet which is the distance from the injection port 8a to the inner surfaces of the nozzles 101c, 101d is configured. With regard to this emission distance of the water jet, 130 mm±10 mm is a predetermined distance.

Therefore, while the device frame 2 is inserted into the inside of the nozzles 101c, 101d by the external abutment members 3, the internal abutment members 4, and the suction units 5, the slide moving mechanism 18 moves the injection nozzle 8 forward or backward so that the injection port 8a is at the position where it faces a predetermined inner surfaces of the nozzles 101c, 101d where the water jet peening is performed. Thereafter, the nozzle push-out moving mechanism 9 pushes out and moves the injection nozzle 8 so as to attain the emission distance. Thereafter, while the water jet is emitted from the injection port 8a of the injection nozzle 8, the rotation moving mechanism 15 rotates and moves the injection nozzle 8. Accordingly, the water jet peening is performed on the predetermined inner surfaces of the nozzles 101c, 101d.

In the present embodiment, the inspection unit 20 inspects the predetermined inner surface (groove welded portion 122) of the nozzles 101c, 101d where the water jet peening is performed. As illustrated in FIGS. 3 to 5, the inspection unit 20 is provided on the support unit 14. Therefore, the inspection unit 20 is rotated and moved about the central axis S by the rotation moving mechanism 15 explained above, and is slid and moved about the central axis S by the slide moving mechanism 18. This inspection unit 20 includes flaw detection sensors 20A and an image-capturing sensor 20B. The flaw detection sensor 20A comes into contact with the inner surfaces of the nozzles 101c, 101d and performs flaw detection inspection, and in the present embodiment, the flaw detection sensor 20A is an eddy-current flaw detection sensor, and the flaw detection sensor 20A is rotated and moved about the central axis S by the rotation moving mechanism 15, so that the flaw detection sensor 20A moves along the peripheral direction with respect to the inner surfaces of the nozzles 101c, 101d to perform flaw detection. In the present embodiment, multiple flaw detection sensors 20A (two flaw detection sensors 20A) are provided in a row so as to be along the peripheral direction of the inner surfaces of the nozzles 101c, 101d which are to be inspected in the present embodiment. The image-capturing sensor 20B captures images of the inner surfaces of the nozzles 101c, 101d so as to visually inspect them, and the image-capturing sensor 20B is rotated and moved about the central axis S by the rotation moving mechanism 15, so that the image-capturing sensor 20B captures images upon moving along the peripheral direction with respect to the inner surfaces of the nozzles 101c, 101d. Although not clearly shown in the drawings, the inspection unit 20 has an illumination for illuminating the portion where images are taken by the image-capturing sensor 20B.

The inspection unit push-out moving mechanism 21 pushes out and moves the inspection unit 20 to the inner surfaces of the nozzles 101c, 101d. As illustrated in FIG. 9, the inspection unit push-out moving mechanism 21 is provided on the support unit 14, and includes slide rails 21a, a slider 21b, a slide base 21c, and an actuator 21d. The pair of slide rails 21a are provided to extend the direction perpendicular to the central axis S, and are formed by extending the slide rails 9a of the nozzle push-out moving mechanism 9 explained above. The slider 21b is supported to be able to move in the direction in which the slide rails 21a extend. The slide base 21c is supported by the slider 21b, and is provided to be able to move in the direction in which the slide rails 21a extend. The flaw detection sensor 20A (see FIG. 10) and the image-capturing sensor 20B which are the inspection unit 20 are attached to the slide base 21c. The actuator 21d is arranged on the support unit 14 so as to be arranged at a side portion of one of the slide rails 21a, and is coupled with the slide base 21c. The actuator 21d is to move the slide base 21c in the direction in which the slide rails 21a extend, and in the present embodiment, the actuator 21d is made of an air pressure cylinder. However, the actuator 21d is not limited to the air pressure cylinder. Anything may be employed as long as it moves the slide base 21c in the direction in which the slide rails 21a extend. The inspection unit push-out moving mechanism 21 drives the actuator 21d to move the slide base 21c as well as the inspection unit 20 (the flaw detection sensor 20A and the image-capturing sensor 20B) in the direction perpendicular to the central axis S. The direction of this push-out movement is a direction in which the inspection unit 20 performs the inspection. In a case of the flaw detection sensor 20A, the direction of this push-out movement is a direction in which the surface in contact with the inner surfaces of the nozzles 101c, 101d faces. In a case of the image-capturing sensor 20B, the direction of this push-out movement is a direction in which images of the inner surfaces of the nozzles 101c, 101d are taken. More specifically, the inspection unit push-out moving mechanism 21 pushes out and moves the inspection unit 20 so that the inspection unit 20 comes closer to the inner surfaces of the nozzles 101c, 101d or the inspection unit 20 moves away from the inner surfaces of the nozzles 101c, 101d.

As illustrated in FIGS. 9 and 10, the inspection unit push-out moving mechanism 21 includes a flaw detection sensor push-out moving mechanism 21A for pushing out and moves the flaw detection sensors 20A alone and an image-capturing sensor push-out moving mechanism 21B for pushing out and moves the image-capturing sensor 20B alone.

As illustrated in FIG. 10, the flaw detection sensor push-out moving mechanism 21A is provided on the slide base 21c, and includes a fixed base 21Aa, slide rails 21Ab, sliders 21Ac, actuators 21Ad, and a slide base 21Ae. The fixed base 21Aa is fixed to the slide base 21c. The slide rails 21Ab are in parallel to the slide rails 9a, and the pair of slide rails 21Ab are provided to extend in the direction perpendicular to the central axis S (see FIG. 3 to FIG. 5). The sliders 21Ac are supported to be able to move in the direction in which the slide rails 21Ab extend. The actuator 21Ad is fixed to the fixed base 21Aa, and is coupled with the slide base 21Ae. The actuator 21Ad is to move the slide base 21Ae in the direction in which the slide rails 21Ab extend, and in the present embodiment, the actuator 21Ad is made of an air pressure cylinder. However, the actuator 21Ad is not limited to the air pressure cylinder. Anything may be employed as long as it moves the slide base 21Ae in the direction in which the slide rails 21Ab extend. The slide base 21Ae supports the flaw detection sensors 20A. Multiple flaw detection sensors 20A (two flaw detection sensors 20A) are provided in a row along the peripheral direction of the inner surfaces of the nozzles 101c, 101d which is the inspection target portion as described above, and the flaw detection sensors 20A are supported on a sensor first support units 20Aa, respectively, so that each of the flaw detection sensors 20A incline in the peripheral direction. Each of the sensor first support units 20Aa is integrally attached to a sensor base 20Ab. The sensor base 20Ab is supported so that both ends of the sensor base 20Ab is supported by a sensor second support units 20Ac so that the sensor base 20Ab inclines about the axial center perpendicular to the slide rail 21Ab and in the direction in which the central axis S extends. The sensor second support units 20Ac are attached to the slide base 21Ae. The sensor second support units 20Ac are supported on the slide base 21Ae with elasticity given by a spring (not shown) and so as to be able to move in the direction in which the slide rails 21Ab extend. More specifically, the flaw detection sensors 20A freely incline in the direction in which the central axis S extends and in the peripheral direction thanks to the sensor first support unit 20Aa and the sensor second support unit 20Ac, and are supported in such a manner as to be urged by the spring to be in contact with the inner surfaces of the nozzles 101c, 101d by following the shapes of the inner surfaces of the nozzles 101c, 101d. The flaw detection sensor push-out moving mechanism 21A drives the actuator 21Ad to push out and move the slide base 21Ae as well as the flaw detection sensors 20A in the direction perpendicular to the central axis S.

As illustrated in FIG. 9, the image-capturing sensor push-out moving mechanism 21B is provided on the slide base 21c, and includes an actuator 21Ba and a slide base 21Bb. The actuator 21Ba is fixed to the slide base 21c, and is coupled with the slide base 21Bb. The actuator 21Ba is to move the slide base 21Bb in the direction in which the slide rails 21a extend, and in the present embodiment, the actuator 21Ba is made of an air pressure cylinder. However, the actuator 21Ba is not limited to the air pressure cylinder. Anything may be employed as long as it moves the slide base 21Bb in the direction in which the slide rails 21a extend. The slide base 21Bb supports the image-capturing sensor 20B. The image-capturing sensor push-out moving mechanism 21B drives the actuator 21Ba to push out and move the slide base 21Bb as well as the image-capturing sensor 20B in the direction perpendicular to the central axis S.

The calibration test unit 22 is to calibrate and examine the inspection unit 20 (the flaw detection sensor 20A and the image-capturing sensor 20B). As illustrated in FIGS. 3 to 5, the calibration test unit 22 is provided on the calibration test unit forward/backward moving mechanism 23. This calibration test unit 22 includes the calibration test piece for the flaw detection sensor 22A calibrating each of the flaw detection sensors 20A and the calibration test piece for the image-capturing sensor 22B calibrating the image-capturing sensor 20B.

The calibration test unit forward/backward moving mechanism 23 moves the calibration test unit 22 to the forward or the backward in the direction along the central axis S. As illustrated in FIGS. 3 to 5, the calibration test unit forward/backward moving mechanism 23 is provided on the device frame 2. Therefore, the calibration test unit forward/backward moving mechanism 23 and the calibration test unit 22 do not affect rotation movement and slide movement of the rotation moving mechanism 15 and the slide moving mechanism 18 explained above. The calibration test unit forward/backward moving mechanism 23 includes a fixed base 23a, slide rails 23b, a slide base 23c, and an actuator 23d. The fixed base 23a is fixed to the device frame 2. The pair of slide rails 23b are provided to extend in parallel to the central axis S. The slide base 23c supports the calibration test unit 22, and is provided to be able to move in the direction in which the slide rails 23b extend. The actuator 23d is fixed to the fixed base 23a, and is coupled with the slide base 23c. The actuator 23d is to move the slide base 23c in the direction in which the slide rails 23b extend, and in the present embodiment, the actuator 23d is made of an air pressure cylinder. However, the actuator 23d is not limited to the air pressure cylinder. Anything may be employed as long as it moves the slide base 23c in the direction in which the slide rails 23b extend. The calibration test unit forward/backward moving mechanism 23 drives the actuator 23d to move, to the forward or the backward, the slide base 23c as well as the calibration test unit 22 (each of the calibration test piece for the flaw detection sensor 22A and the calibration test piece for the image-capturing sensor 22B) in a straight track parallel to the central axis S (see FIG. 11 to FIG. 15).

Figure 11:
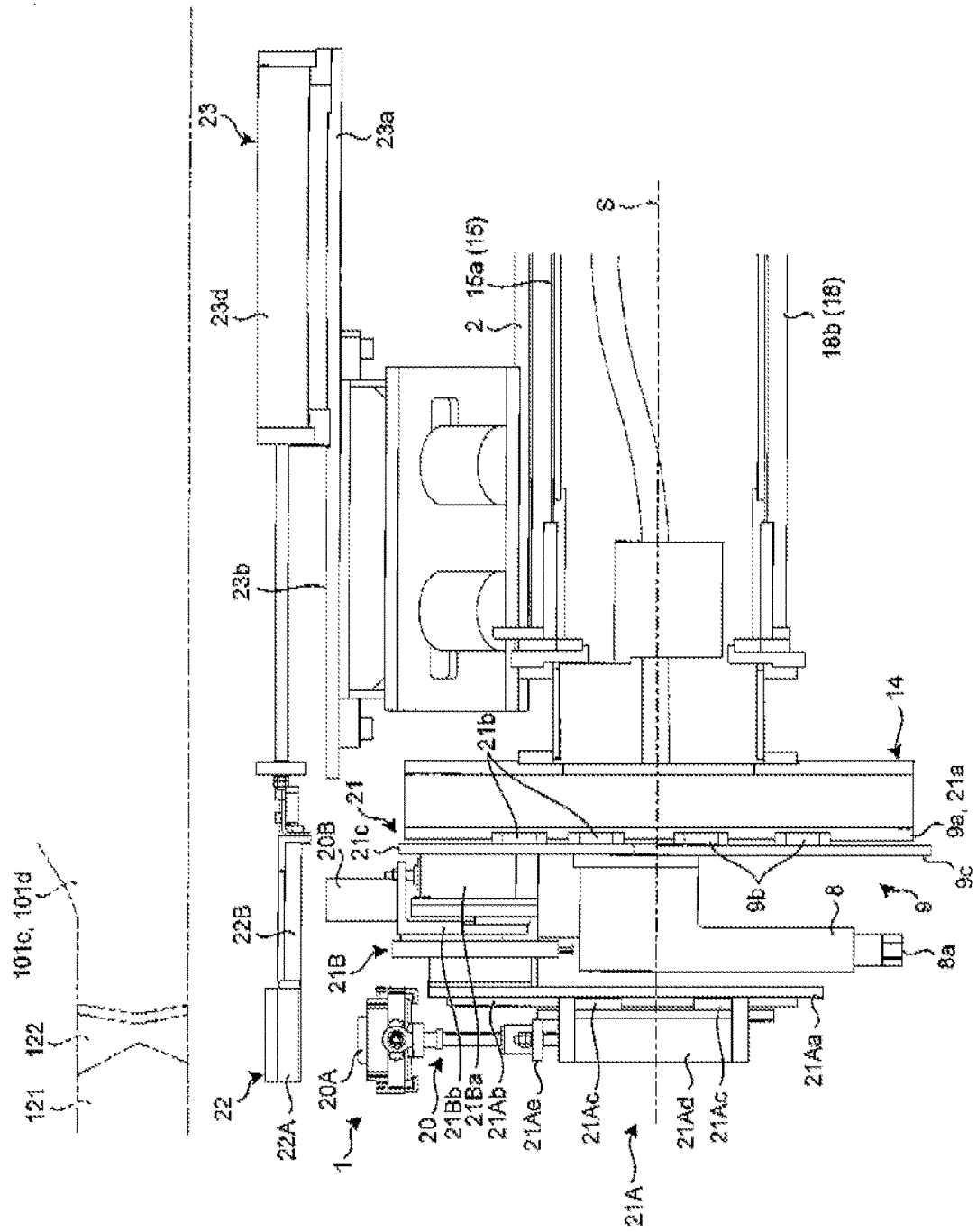
FIG. 11 is a schematic view illustrating inspection procedure of the inspection device according to an embodiment of the present invention.
Figure 14:
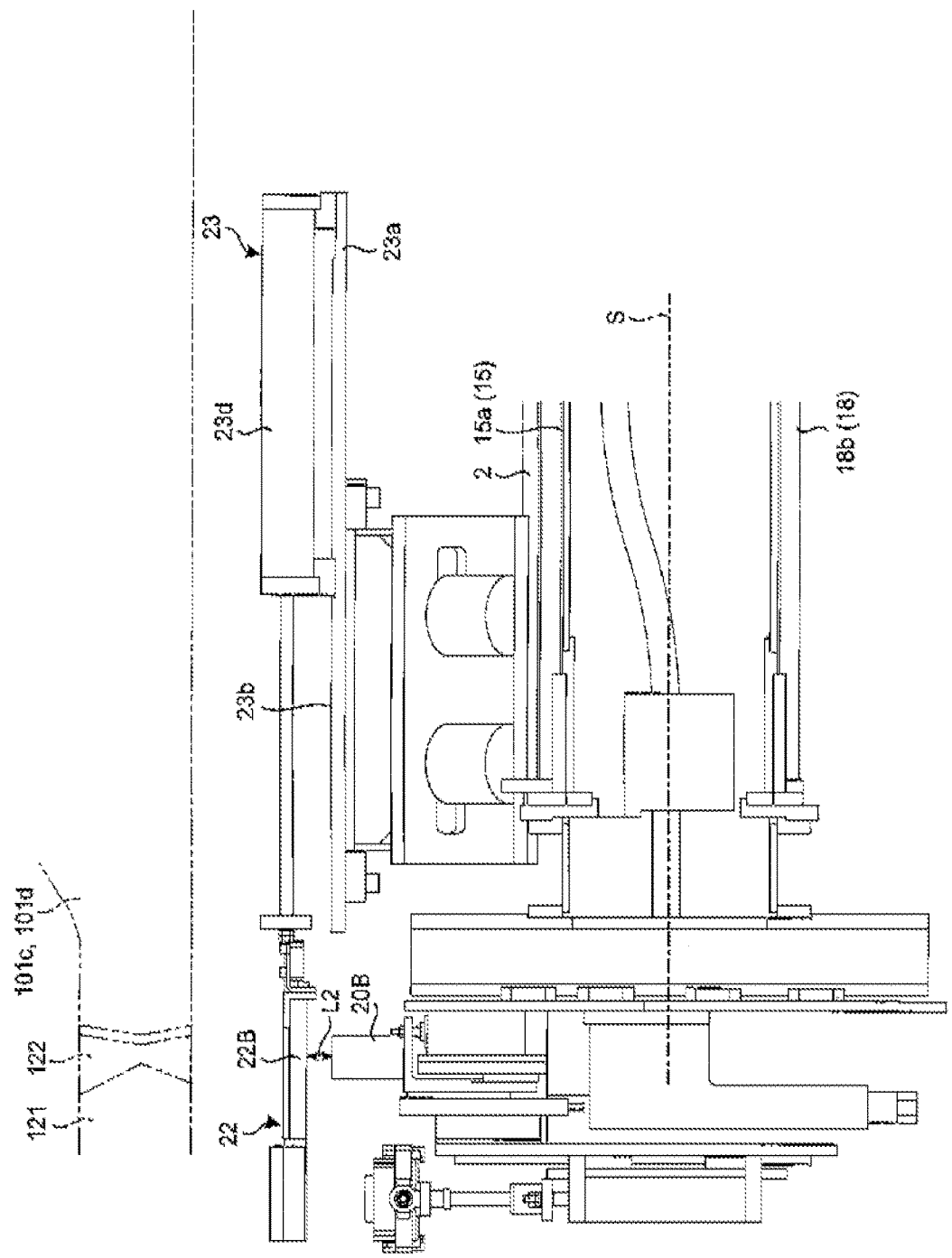
FIG. 14 is a schematic view illustrating inspection procedure of the inspection device according to an embodiment of the present invention.
Figure 15:
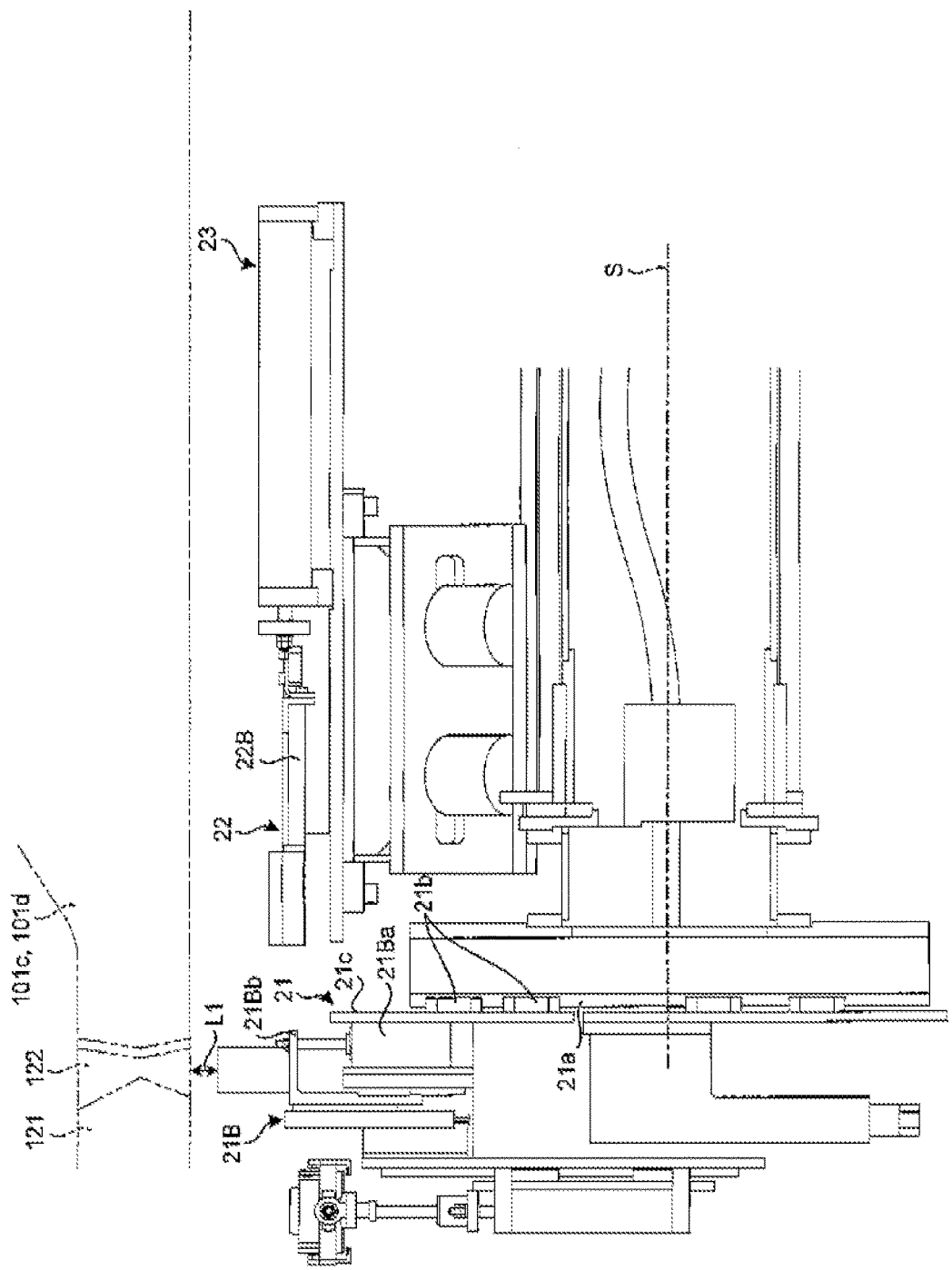
FIG. 15 is a schematic view illustrating inspection procedure of the inspection device according to an embodiment of the present invention.

In this case, the calibration test unit 22 supported by the slide base 23c arranges the position of each of the calibration test piece for the flaw detection sensor 22A and the calibration test piece for the image-capturing sensor 22B in such a manner that the position of each of the calibration test piece for the flaw detection sensor 22A and the calibration test piece for the image-capturing sensor 22B is aligned with the position where each of the flaw detection sensors 20A and the image-capturing sensor 20B of the inspection unit 20 explained above is above the device frame 2 in the vertical direction and faces the inner surfaces of the nozzles 101c, 101d which is the inspection target portion. For this reason, as illustrated in FIGS. 11 and 14, in the forward-moved state with the calibration test unit forward/backward moving mechanism 23, each of the calibration test piece for the flaw detection sensor 22A and the calibration test piece for the image-capturing sensor 22B matches the position where each of the flaw detection sensor 20A and the image-capturing sensor 20B faces the inner surfaces of the nozzles 101c, 101d which is the inspection target portion with regard to the track of the push-out movement of the inspection unit 20 (the flaw detection sensor 20A and the image-capturing sensor 20B). As illustrated in FIGS. 14 and 15, in the forward-moved state with the calibration test unit forward/backward moving mechanism 23, the calibration test unit 22 is arranged to be aligned with the position of a distance L2 which is the same as a distance L1 when the image-capturing sensor 20B captures images of the inner surfaces of the nozzles 101c, 101d.

Hereinafter, inspection procedure (inspection method) with the inspection device 1 will be explained. FIGS. 11 to 15 illustrate that the device frame 2 inserted into the predetermined position inside of the nozzles 101c, 101d is positioned by the external abutment members 3, and the central (central axis S) position of the device frame 2 is aligned with the central position of the nozzles 101c, 101d by the internal abutment members 4, and this state is maintained by the suction units 5. The rotation moving mechanism 15 is set so that each of the flaw detection sensors 20A and the image-capturing sensor 20B of the inspection unit 20 is at a position (reference position) where they face the upper side of the device frame 2 in the vertical direction.

Figure 12:
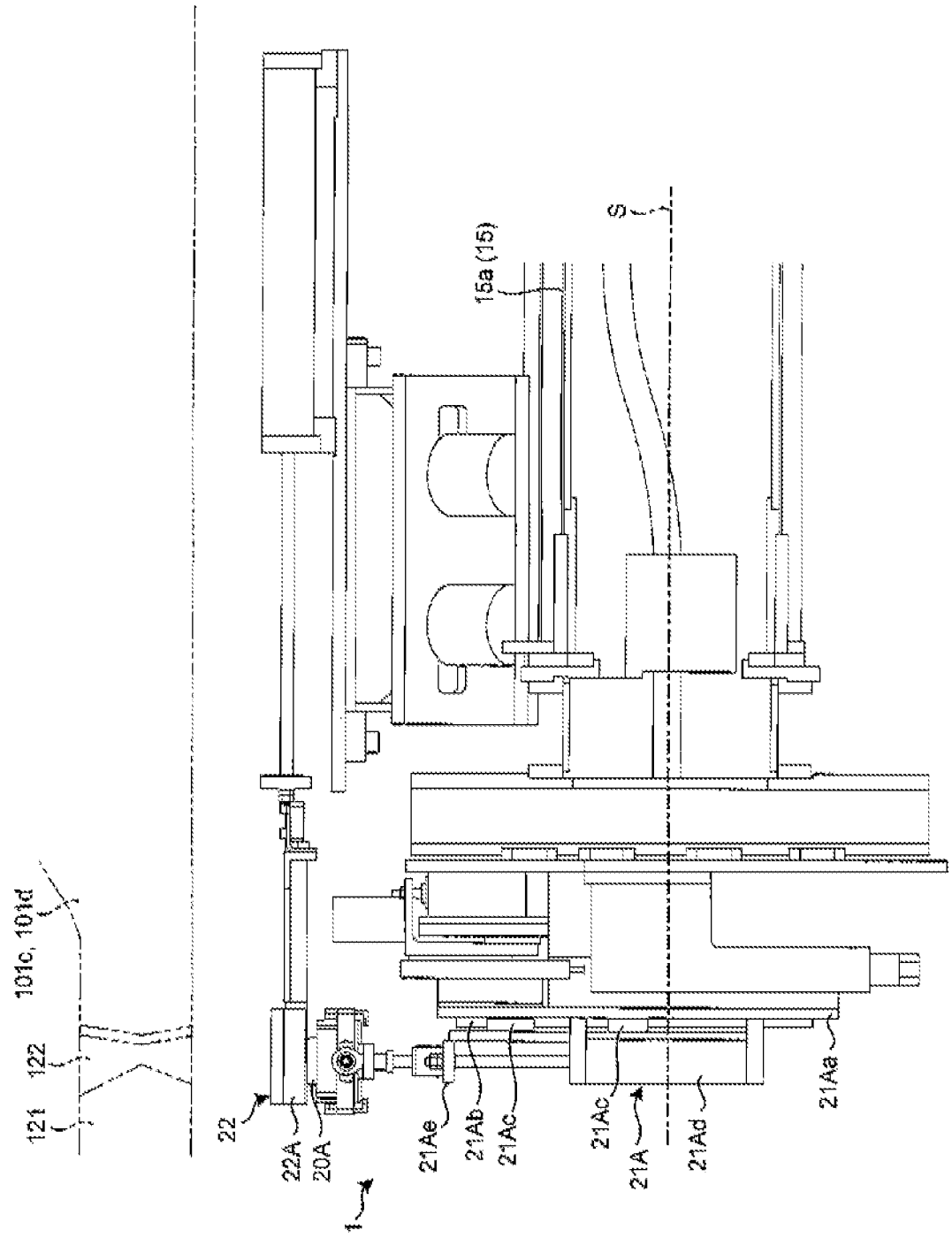
FIG. 12 is a schematic view illustrating inspection procedure of the inspection device according to an embodiment of the present invention.
Figure 13:
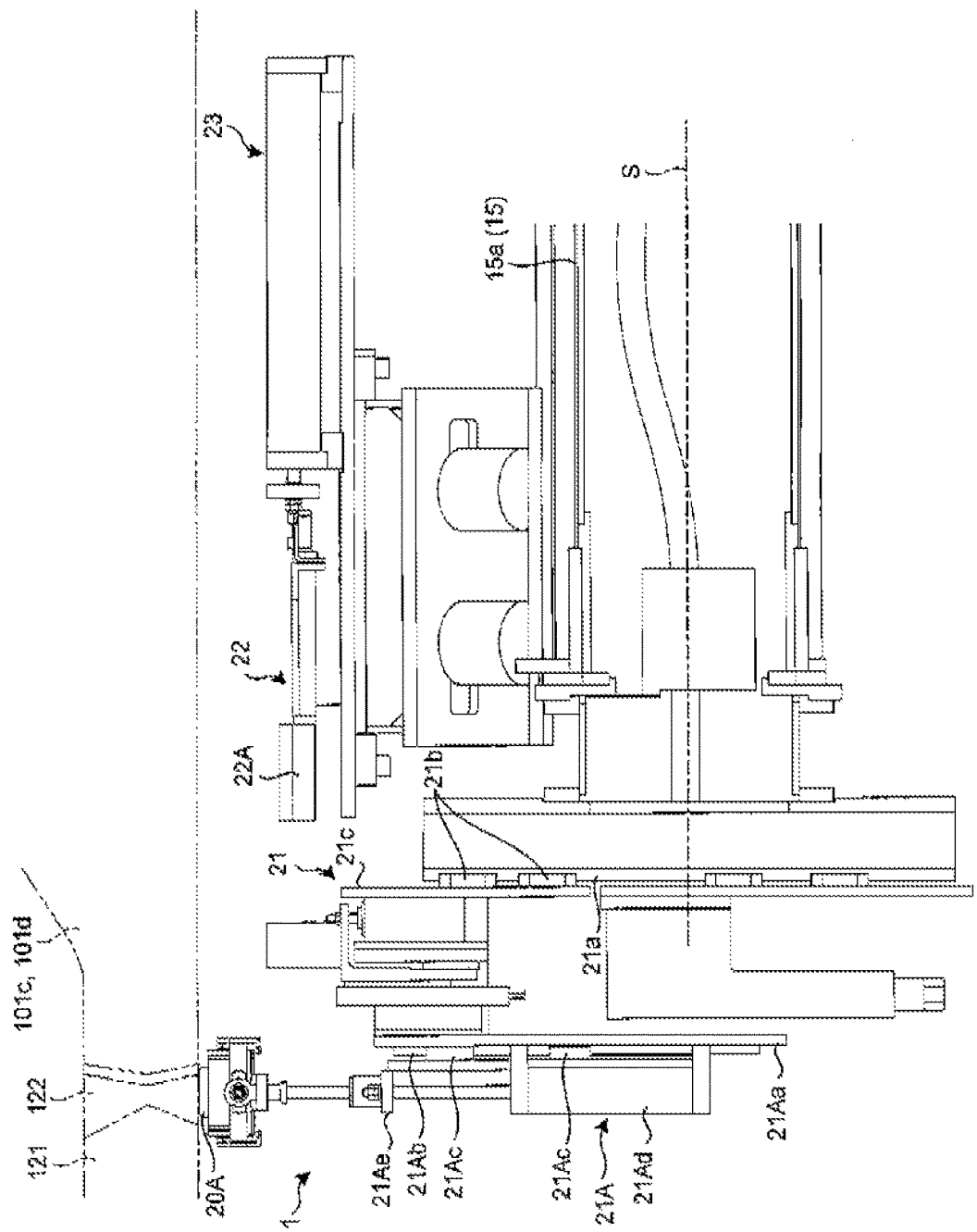
FIG. 13 is a schematic view illustrating inspection procedure of the inspection device according to an embodiment of the present invention.

Then, when the flaw detection sensor 20A performs the flaw detection inspection, the slide moving mechanism 18 makes slide movement in parallel to the central axis S, so that each of the flaw detection sensors 20A of the inspection unit 20 is at the position below the groove welded portion 122 in the vertical direction as illustrated in FIG. 11. In this state, the calibration test unit forward/backward moving mechanism 23 moves the calibration test unit 22 forward. Accordingly, at the reference position where the inspection device 1 is inserted into the inside of the nozzles 101*c*, 101*d*, each of the calibration test pieces for the flaw detection sensors 22A are arranged on the track where each of the flaw detection sensors 20A makes push-out movement to the inner surfaces of the nozzles 101*c*, 101*d*. Subsequently, as illustrated in FIG. 12, the flaw detection sensor push-out moving mechanism 21A pushes out and moves the flaw detection sensors 20A in the direction perpendicular to the central axis S to make the flaw detection sensors 20A be in contact with the calibration test pieces for the flaw detection sensors 22A, respectively. Subsequently, the rotation moving mechanism 15 rotates and moves the flaw detection sensors 20A about the central axis S and perform flaw detection on the calibration test pieces for the flaw detection sensors 22A. Accordingly, on the basis of each of the calibration test pieces for the flaw detection sensors 22A, each of the flaw detection sensors 20A is calibrated and tested. Subsequently, as illustrated in FIG. 13, the calibration test unit forward/backward moving mechanism 23 moves the calibration test unit 22 backward. Subsequently, the inspection unit push-out moving mechanism 21 and flaw detection sensor push-out moving mechanism 21A pushes out and moves each of the flaw detection sensors 20A in the direction perpendicular to the central axis S to make each of the flaw detection sensors 20A be in contact with the inner surfaces of the nozzles 101*c*, 101*d* (groove welded portion 122). Subsequently, the rotation moving mechanism 15 rotates and moves each of the flaw detection sensors 20A about the central axis S, and the flaw detection is performed on the inner surfaces of the nozzles 101*c*, 101*d*. Therefore, each of the flaw detection sensors 20A performs the flaw detection inspection. Subsequently, as illustrated in FIGS. 11 and 12, on the basis of each of the calibration test pieces for the flaw detection sensors 22A, each of the flaw detection sensors 20A is calibrated and tested after the inspection.

When the visual inspection is performed with image-capturing sensor 20B, the slide moving mechanism 18 makes slide movement in parallel to the central axis S so that the image-capturing sensor 20B of the inspection unit 20 is at the position below the groove welded portion 122 in the vertical direction as illustrated in FIG. 14. In this state, the calibration test unit forward/backward moving mechanism 23 moves the calibration test unit 22 forward. Accordingly, at the reference position where the inspection device 1 is inserted into the inside of the nozzles 101*c*, 101*d*, the calibration test piece for the image-capturing sensor 22B is arranged on the track where the image-capturing sensor 20B makes push-out movement to the inner surfaces of the nozzles 101*c*, 101*d*. Therefore, on the basis of the calibration test piece for the image-capturing sensor 22B, the image-capturing sensor 20B is calibrated and tested. Subsequently, as illustrated in FIG. 15, the calibration test unit forward/backward moving mechanism 23 moves the calibration test unit 22 backward. Subsequently, the inspection unit push-out moving mechanism 21 and the image-capturing sensor push-out moving mechanism 21B push out and move the image-capturing sensor 20B in the direction perpendicular to the central axis S. Subsequently, the rotation moving mechanism 15 rotates and moves the image-capturing sensor 20B about the central axis S, and images of the inner surfaces of the nozzles 101*c*, 101*d* are captured. Accordingly, visual inspection is performed with video taken by the image-capturing sensor 20B. Subsequently, as illustrated in FIG. 14, on the basis of the calibration test piece for the image-capturing sensor 22B, the image-capturing sensor 20B is calibrated and tested after the inspection.

As described above, an inspection method of the present embodiment is an inspection method for inspecting a body, which is to be inspected, which is provided in the nuclear power plant, and the inspection method includes a step of arranging the inspection device 1 having the inspection unit 20 and the calibration test unit 22 at the reference position where the body which is to be inspected is inspected, a step of subsequently moving the calibration test unit 22 forward or backward with regard to the track where the inspection unit 20 makes push-out movement to the inspection target portion of the body which is to be inspected, and calibrating the inspection unit 20, and a step of subsequently causing the inspection unit 20 to inspect the inspection target portion.

According to the inspection method, when the inspection target portion of the body which is to be inspected is inspected, the inspection unit 20 can be calibrated and tested on the track where the inspection unit 20 makes push-out movement. As a result, the inspection and calibration can be performed without moving the inspection device 1 from the processed position. Therefore, highly reliable inspection result can be obtained from accurate calibration. Moreover, since the inspection unit 20 is calibrated and tested within the range that the inspection unit 20 can make push-out movement, the inspection unit 20 can be calibrated and tested even in a location where the condition is limited in which the inspection unit 20 can make push-out movement.

An inspection method of the present embodiment is an inspection method for inspecting the inner surfaces of the nozzles 101*c*, 101*d* provided in the reactor vessel 101, and the inspection method includes a step of inserting the inspection device 1 including the inspection unit 20 and the calibration test unit 22 into the inside of the nozzles 101*c*, 101*d*, a step of subsequently moving the calibration test unit 22 forward or backward with regard to the track where the inspection unit 20 makes push-out movement to the inner surfaces of the nozzles 101*c*, 101*d* at the reference position where the inspection device 1 is inserted into the inside of the nozzles 101*c*, 101*d*, and calibrating the inspection unit 20, and a step of subsequently causing the inspection unit 20 to inspect the inner surfaces of the nozzles 101*c*, 101*d*.

According to the inspection method, when the inner surfaces of the nozzles 101*c*, 101*d* provided on the reactor vessel 101 is inspected, the inspection unit 20 can be calibrated and tested on the track where the inspection unit 20 makes push-out movement. As a result, the inspection and calibration can be performed without moving the inspection device 1 from the processed position. Therefore, highly reliable inspection result can be obtained from accurate calibration.

The inspection method of the present embodiment further includes, after the step of causing the inspection unit 20 to inspect the inner surfaces of the nozzles 101*c*, 101*d*, a step of moving the calibration test unit 22 forward or backward with regard to the track where the inspection unit 20 makes push-out movement to the inner surfaces of the nozzles 101c, 101d at the reference position and calibrating the inspection unit 20 after the inspection.

According to the inspection method, after the inner surfaces of the nozzles 101c, 101d provided in the reactor vessel 101 are inspected, the inspection unit 20 can be calibrated and tested on the track where the inspection unit 20 makes push-out movement. As a result, the calibration can be performed after the inspection without moving the inspection device 1 from the processed position. Therefore, highly reliable inspection result can be obtained from accurate calibration.

The inspection device 1 of the present embodiment is an inspection device for inspecting a body, which is to be inspected, provided in the nuclear power plant, and the inspection device 1 includes the device frame 2 installed at the reference position for inspecting the body which is to be inspected, the inspection unit 20 provided on the device frame 2 for inspecting the inspection target portion of the body which is to be inspected, the inspection unit push-out moving mechanism 21 for pushing out and moving the inspection unit 20 to the inspection target portion while the device frame 2 is installed at the reference position, the calibration test unit 22 provided on the device frame 2 for calibrating the inspection unit 20, and the calibration test unit forward/backward moving mechanism 23 for moving the calibration test unit 22 forward or backward with regard to the track where the inspection unit 20 makes push-out movement in such a state that the inspection unit 20 is installed at the reference position.

According to this inspection device, when the inspection target portion of the body which is to be inspected is inspected, the inspection unit 20 can be calibrated and tested on the track where the inspection unit 20 makes push-out movement. As a result, the inspection and calibration can be performed without moving the inspection device 1 from the processed position. Therefore, highly reliable inspection result can be obtained from accurate calibration. Moreover, since the inspection unit 20 is calibrated and tested within the range that the inspection unit 20 can make push-out movement, the footprint is reduced, and the inspection unit 20 can be calibrated and tested even in a location where the condition is limited in which the inspection unit 20 can make push-out movement. Further, the calibration test unit 22 can be moved forward and backward with regard to the track where the inspection unit 20 makes push-out movement, and therefore, the device configuration is simplified, and the footprint is reduced, and the size of the device can be reduced.

The inspection device 1 of the present embodiment is the inspection device 1 for inspecting the inner surfaces of the nozzles 101c, 101d provided in the reactor vessel 101, and the inspection device 1 includes the device frame 2 inserted into the inside of the nozzles 101c, 101d, the inspection unit 20 provided on the device frame 2 for inspecting the inner surfaces of the nozzles 101c, 101d, the inspection unit push-out moving mechanism 21 for pushing out and moving the inspection unit 20 to the inner surfaces of the nozzles 101c, 101d while the device frame 2 is installed in the inside of the nozzles 101c, 101d, the rotation moving mechanism 15 for rotating and moving the inspection unit 20 about a predetermined central axis S along a peripheral direction of the nozzles 101c, 101d while the device frame 2 is installed in the inside of the nozzles 101c, 101d, the calibration test unit 22 arranged on the device frame 2 for calibrating the inspection unit 20, and a calibration test unit forward/backward moving mechanism 23 for moving the calibration test unit 22 forward or backward in the direction along the central axis S with regard to the track where the inspection unit 20 makes push-out movement.

According to this inspection device 1, when the inner surfaces of the nozzles 101c, 101d provided in the reactor vessel 101 are inspected, the inspection unit 20 can be calibrated and tested on the track where the inspection unit 20 makes push-out movement. As a result, the inspection and calibration can be performed without moving the inspection device 1 from the processed position. Therefore, highly reliable inspection result can be obtained from accurate calibration.

In the inspection device 1 of the present embodiment, the inspection unit 20 has at least one of the flaw detection sensor 20A coming into contact with the inner surfaces of the nozzles 101c, 101d and performing flaw detection and the image-capturing sensor 20B for capturing an image of the inner surfaces of the nozzles 101c, 101d, and the calibration test unit 22 has at least one of the calibration test piece for the flaw detection sensor 22A for calibrating the flaw detection sensor 20A and the calibration test piece for the image-capturing sensor 22B for calibrating the image-capturing sensor 20B.

According to this inspection device 1, in at least one of the flaw detection inspection with the flaw detection sensor 20A and the visual inspection with the image-capturing sensor 20B, the inspection and calibration can be performed without moving the inspection device 1 from the processed position. Therefore, highly reliable inspection result can be obtained from accurate calibration.

In the inspection device 1 of the present embodiment, the inspection unit 20 has the flaw detection sensor 20A that comes into contact with the inner surfaces of the nozzles 101c, 101d and performs flaw detection and the image-capturing sensor 20B for capturing images of the inner surfaces of the nozzles 101c, 101d, which are arranged in a row along the central axis S, and the calibration test unit 22 has the calibration test piece for the flaw detection sensor 22A for calibrating the flaw detection sensor 20A and the calibration test piece for the image-capturing sensor 22B for calibrating the image-capturing sensor 20B, which are arranged along the central axis S in alignment with the position where the flaw detection sensor 20A and the image-capturing sensor 20B are arranged in a row.

According to this inspection device 1, the calibration test piece for the flaw detection sensor 22A and the calibration test piece for the image-capturing sensor 22B are arranged along the central axis S in alignment with the position where the flaw detection sensor 20A and the image-capturing sensor 20B are arranged in a row, and therefore, the calibration test unit forward/backward moving mechanism 23 for moving them forward or backward can be provided as a common configuration, so that both calibration tests can be performed with one mechanism and with one operation, and in addition, this can reduce the size of the device.

In the inspection device 1 of the present embodiment, the calibration test unit 22 is arranged to be aligned with the position of a distance L2 which is the same as a distance L1 when the image-capturing sensor 20B captures images of the inner surfaces of the nozzles 101c, 101d, while the inspection device 1 is installed in the inside of the nozzles 101c, 101d.

According to this inspection device 1, the image-capturing sensor 20B can be calibrated under the same condition as the case of the visual inspection performed with the image-capturing sensor 20B, and still more highly reliable inspection result can be obtained from still more accurate calibration.

Figure 16:
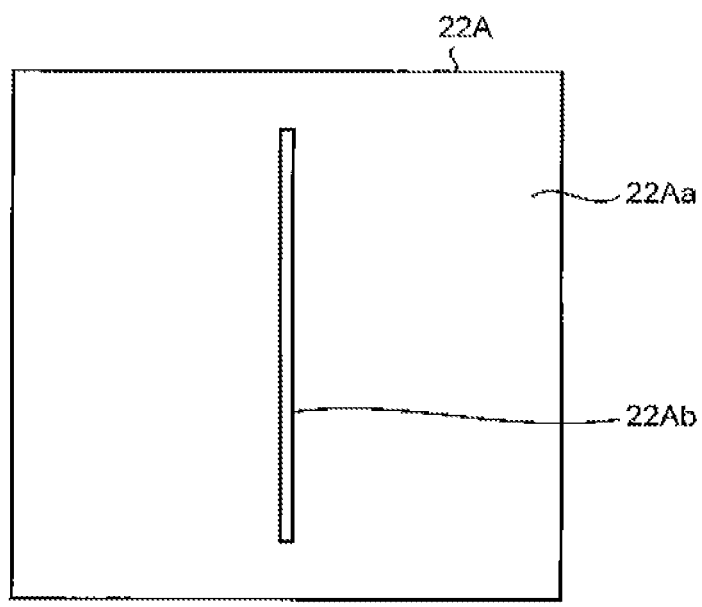
FIG. 16 is a top view illustrating a calibration test piece for a flaw detection sensor.
Figure 17:
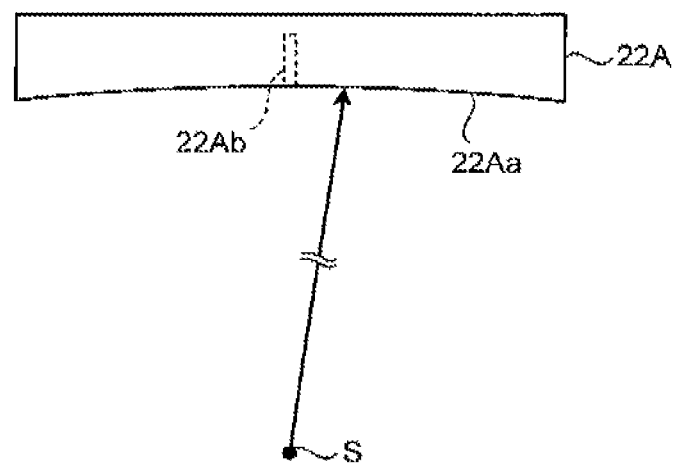
FIG. 17 is a side view illustrating the calibration test piece for the flaw detection sensor.
Figure 18:
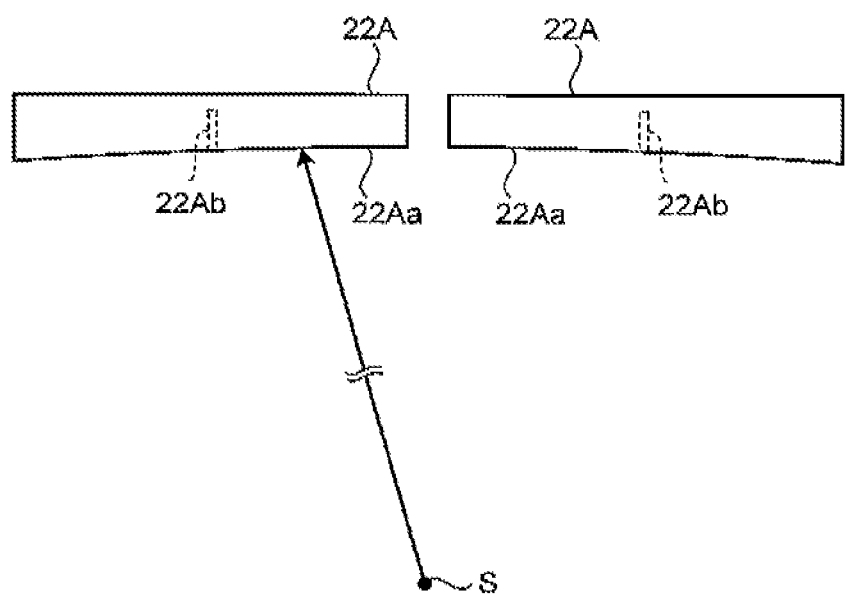
FIG. 18 is a side view illustrating the calibration test piece for the flaw detection sensor.
Figure 19:
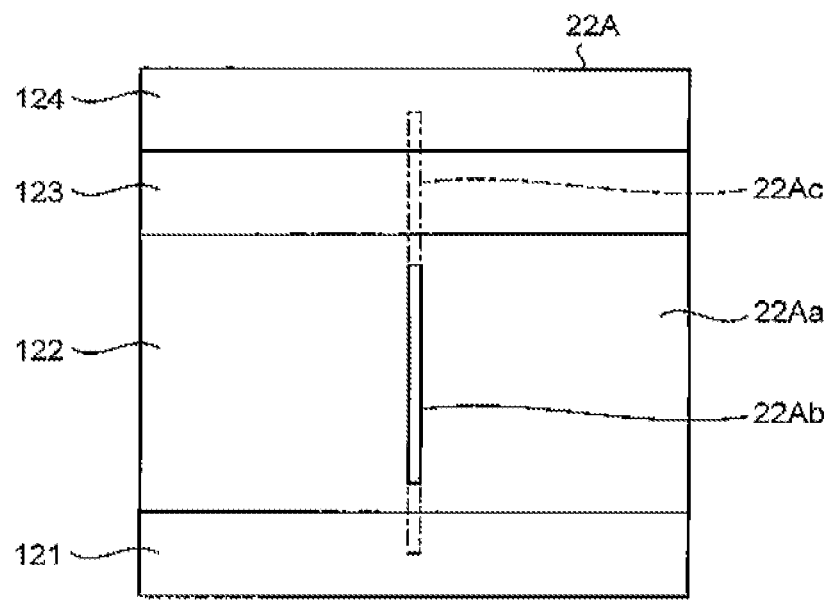
FIG. 19 is a top view illustrating another example of the calibration test piece for the flaw detection sensor.
Figure 20:
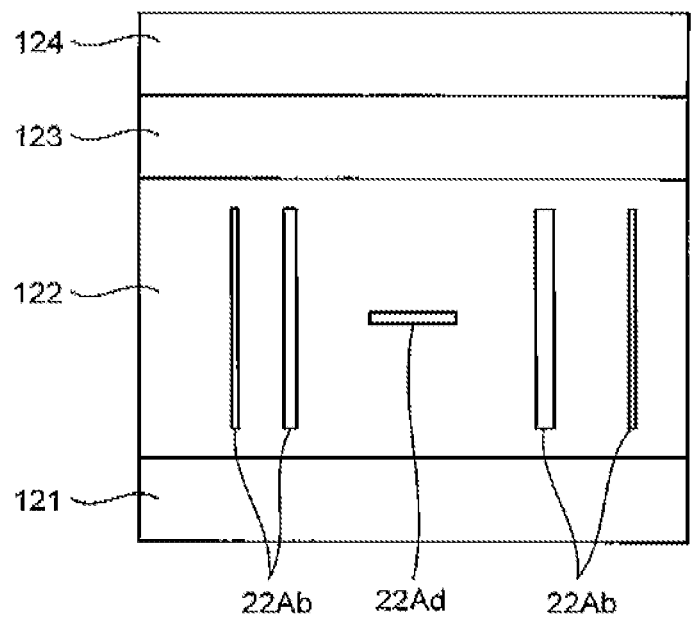
FIG. 20 is a top view illustrating another example of the calibration test piece for the flaw detection sensor.
Figure 21:
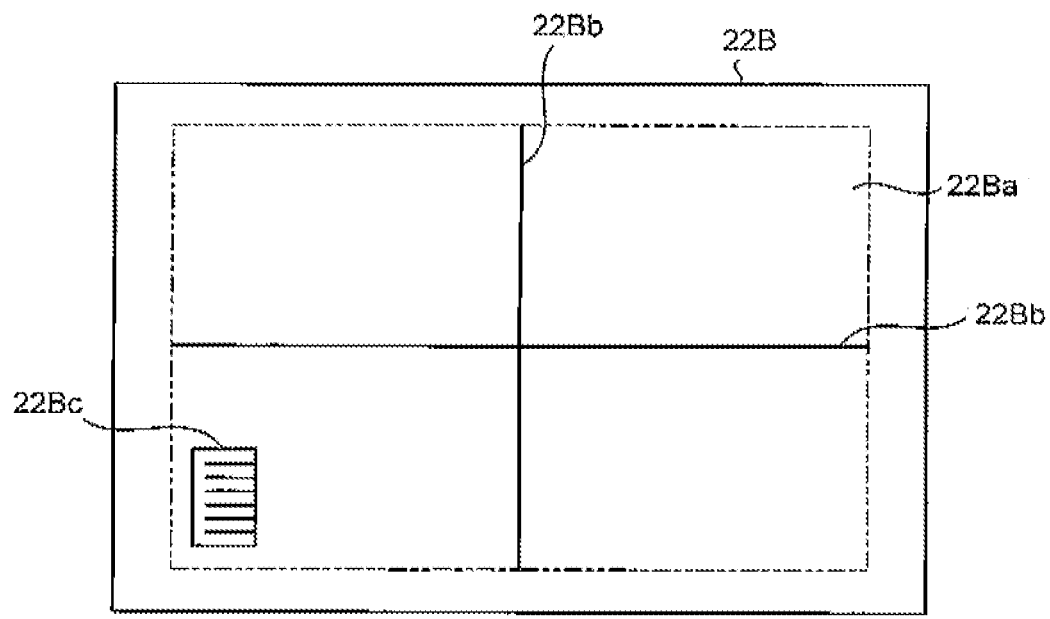
FIG. 21 is a top view illustrating a calibration test piece for an image-capturing sensor.
Figure 22:
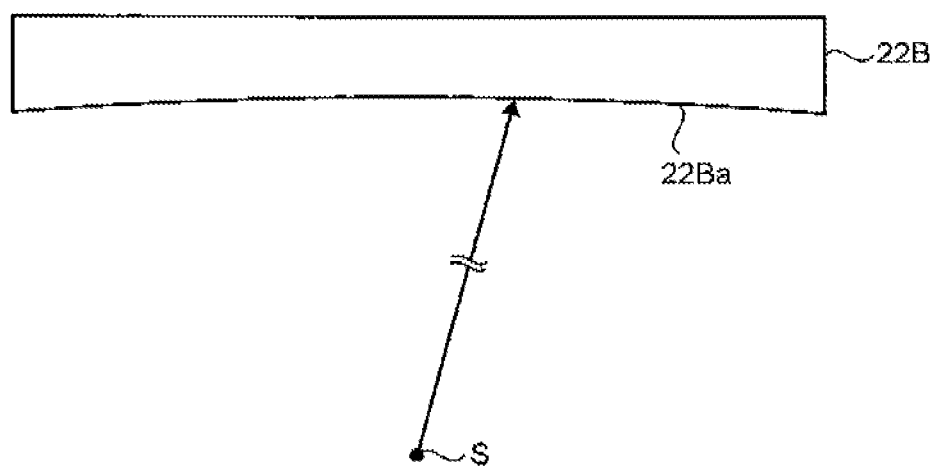
FIG. 22 is a side view illustrating the calibration test piece for the image-capturing sensor.

By the way, FIG. 16 is a top view illustrating the calibration test piece for the flaw detection sensor. FIG. 17 is a side view illustrating the calibration test piece for the flaw detection sensor. FIG. 18 is a side view illustrating the calibration test piece for the flaw detection sensor. FIG. 19 is a top view illustrating another example of the calibration test piece for the flaw detection sensor. FIG. 20 is a top view illustrating another example of the calibration test piece for the flaw detection sensor. FIG. 21 is a top view illustrating the calibration test piece for the image-capturing sensor. FIG. 22 is a side view illustrating the calibration test piece for the image-capturing sensor.

The calibration test piece for the flaw detection sensor 22A as shown in FIGS. 16 to 20 corresponds to one flaw detection sensor 20A. The calibration test piece for the flaw detection sensor 22A as shown in FIGS. 16 and 17 has a test surface 22Aa having such a curvature that the central axis S is the center. The test surface 22Aa is a surface with which the flaw detection sensor 20A comes into contact, and the calibration groove 22Ab is a surface formed perpendicular to the scanning direction of the flaw detection sensor 20A. When the calibration test unit forward/backward moving mechanism 23 moves the calibration test unit 22 forward, the groove 22Ab is formed to be arranged in the center of the scanning direction of the flaw detection sensor 20A. Therefore, sufficient scanning space for the flaw detection sensor 20A can be ensured from the groove 22Ab to both ends of the test surface 22Aa.

Therefore, when the test surface 22Aa having such a curvature that the central axis S is the center is provided just like the calibration test piece for the flaw detection sensor 22A as shown in FIGS. 16 and 17, the scanning of the inner surfaces of the nozzles 101c, 101d with the flaw detection sensor 20A and the scanning of the calibration test piece for the flaw detection sensor 22A are of the same condition. As a result, still more highly reliable inspection result can be obtained from still more accurate calibration.

In the inspection device 1 of the present embodiment, two flaw detection sensors 20A are provided in a row along the peripheral direction of the inner surfaces of the nozzles 101c, 101d which is the inspection target portion. Therefore, as illustrated in FIG. 18, two calibration test pieces for the flaw detection sensors 22A are arranged in a row in association with the flaw detection sensors 20A, and each has the test surface 22Aa having such a curvature that the central axis S is the center with the two of them. Therefore, the scanning of the inner surfaces of the nozzles 101c, 101d with each of the flaw detection sensors 20A and the scanning of each of the calibration test pieces for the flaw detection sensors 22A are of the same condition. As a result, still more highly reliable inspection result can be obtained from still more accurate calibration. This can also be applied to the calibration test piece for the flaw detection sensor 22A as shown in FIGS. 19 and 20.

In the calibration test piece for the flaw detection sensor 22A as shown in FIG. 19, the inspection target portion is a welded portion (groove welded portion 122) of the inner surfaces of the nozzles 101c, 101d, and the calibration test piece is formed to imitate the material and the form of the welded portion and the portion therearound. More specifically, as illustrated in FIG. 19, on the surface of the groove welded portion 122, there is a safe-end tube 121 made of stainless steel at one side in the direction along the central axis S, and there is a buttering welded portion 123 at the other side, and there is an overlay welded portion 124 at the still other side of the buttering welded portion 123. Inside of the cross section of the overlay welded portion 124, there is low-alloy steel which is the material of the nozzles 101c, 101d. The calibration test piece for the flaw detection sensor 22A as shown in FIG. 19 is formed to imitate the material and the form of the groove welded portion 122 and the portion therearound.

Therefore, when the material and the form of the welded portion and the portion therearound are imitated just like the calibration test piece for the flaw detection sensor 22A as shown in FIG. 19, calibration is performed in a state similar to actual inspection. When the groove 22Ac is also formed around the welded portion (groove welded portion 122) as indicated by an alternate long and short dashed line of FIG. 19, evaluation can be performed even when failure (crack) is found around the welded portion.

In FIG. 20, the calibration test piece for the flaw detection sensor 22A is formed with multiple types of grooves 22Ab, 22Ad of which depths and extension directions are different. For example, the groove 22Ab is formed perpendicular to the scanning direction of the flaw detection sensor 20A, and the groove 22Ad is formed along the scanning direction of the flaw detection sensor 20A. Both sides of the grooves 22Ab are grooves which are considered to have ordinary failure (crack) having, e.g., a width of 0.5 mm, the second from the left is a groove which is considered to have deep failure (crack) having, e.g., a width of 1.0 mm, and the second from the right is a groove which is considered to have still deeper failure (crack) having, e.g., a width of 3.0 mm. It should be noted that the calibration test piece for the flaw detection sensor 22A as shown in FIG. 20 imitates the material and the form of the welded portion and the portion therearound just like FIG. 19. However, the calibration test piece for the flaw detection sensor 22A as shown in FIG. 20 may not imitate the material and the form of the welded portion and the portion therearound just like FIG. 19.

Therefore, when multiple types of grooves 22Ab, 22Ad of which depths and extension directions are different are formed just like the calibration test piece for the flaw detection sensor 22A as shown in FIG. 20, evaluation can be performed even when unexpected failure (crack) is found.

The calibration test piece for the image-capturing sensor 22B as shown in FIGS. 21 and 22 has the test surface 22Ba having such a curvature that the central axis S is the center. The test surface 22Ba is a surface of which image is captured by the image-capturing sensor 20B, and is a surface formed with a scale 22Bc which is an index of size and one mm wire 22Bb which is an image-capturing range (indicated by a chain double-dashed line) of the image-capturing sensor 20B.

Therefore, when the test surface 22Ba having such a curvature that the central axis S is the center is provided just like the calibration test piece for the image-capturing sensor 22B as shown in FIGS. 21 and 22, the inner surfaces of the nozzles 101c, 101d captured by the image-capturing sensor 20B and the test surface 22Ba of the calibration test piece for the image-capturing sensor 22B are of the same condition. As a result, still more highly reliable inspection result can be obtained from still more accurate calibration.

According to an embodiment of inspection method, when the inspection target portion of the body which is to be inspected is inspected, the inspection unit can be calibrated and tested on the track where the inspection unit makes push-out movement. As a result, the inspection and calibration can be performed without moving the inspection device from the processed position. Therefore, highly reliable inspection result can be obtained from accurate calibration. Moreover, since the inspection unit is calibrated and tested within the range that the inspection unit can make push-out movement, the inspection unit can be calibrated and tested even in a location where the condition is limited in which the inspection unit can make push-out movement.

According to an embodiment of inspection method, when the inner surfaces of the nozzles provided on the reactor vessel is inspected, the inspection unit can be calibrated and tested on the track where the inspection unit makes push-out movement. As a result, the inspection and calibration can be performed without moving the inspection device from the processed position. Therefore, highly reliable inspection result can be obtained from accurate calibration.

According to an embodiment of inspection method, after the inner surfaces of the nozzles provided in the reactor vessel are inspected, the inspection unit can be calibrated and tested on the track where the inspection unit makes push-out movement. As a result, the calibration can be performed after the inspection without moving the inspection device from the processed position. Therefore, highly reliable inspection result can be obtained from accurate calibration.

According to an embodiment of inspection device, when the inspection target portion of the body which is to be inspected is inspected, the inspection unit can be calibrated and tested on the track where the inspection unit makes push-out movement. As a result, the inspection and calibration can be performed without moving the inspection device from the processed position. Therefore, highly reliable inspection result can be obtained from accurate calibration. Moreover, since the inspection unit is calibrated and tested within the range that the inspection unit can make push-out movement, the footprint is reduced, and the inspection unit can be calibrated and tested even in a location where the condition is limited in which the inspection unit can make push-out movement. Further, the calibration test unit can be moved forward and backward with regard to the track where the inspection unit makes push-out movement, and therefore, the device configuration is simplified, and the footprint is reduced, and the size of the device can be reduced.

According to an embodiment of inspection device, when the inner surfaces of the nozzles provided in the reactor vessel are inspected, the inspection unit can be calibrated and tested on the track where the inspection unit makes push-out movement. As a result, the inspection and calibration can be performed without moving the inspection device from the processed position. Therefore, highly reliable inspection result can be obtained from accurate calibration.

According to an embodiment of inspection device, in at least one of the flaw detection inspection with the flaw detection sensor and the visual inspection with the image-capturing sensor, the inspection and calibration can be performed without moving the inspection device from the processed position. Therefore, highly reliable inspection result can be obtained from accurate calibration.

According to an embodiment of inspection device, the calibration test piece for the flaw detection sensor and the calibration test piece for the image-capturing sensor are arranged along the central axis in alignment with the position where the flaw detection sensor and the image-capturing sensor are arranged in a row, and therefore, the calibration test unit forward/backward moving mechanism for moving them forward or backward can be provided as a common configuration, so that both calibration tests can be performed with one mechanism and with one operation, and in addition, this can reduce the size of the device.

According to an embodiment of inspection device, the image-capturing sensor can be calibrated under the same condition as the case of the visual inspection performed with the image-capturing sensor, and still more highly reliable inspection result can be obtained from still more accurate calibration.

According to an embodiment of inspection device, when the test surface having such a curvature that the central axis is the center is provided, the inspection of the inner surfaces of the nozzles with the inspection unit and the calibration test with the calibration test unit are of the same condition. As a result, still more highly reliable inspection result can be obtained from still more accurate calibration.

According to an embodiment of inspection device, when the material and the form of the welded portion and the portion therearound are imitated, calibration can be performed in a state similar to actual inspection.

According to an embodiment of inspection device, when multiple types of grooves of which depths and extension directions are different are formed, evaluation can be performed even when unexpected failure (crack) is found.

Advantageous Effects of Invention

According to the embodiments of the present invention, the inspection and calibration can be performed without moving the device from the processed position.

REFERENCE SIGNS LIST

1 inspection device
2 device frame
3 external abutment member
4 internal abutment member
5 suction unit
6 abutment detection unit
7 image-capturing unit
15 rotation moving mechanism
18 slide moving mechanism
20 inspection unit
20A flaw detection sensor
20B image-capturing sensor
21 inspection unit push-out moving mechanism
21A flaw detection sensor push-out moving mechanism
21B image-capturing sensor push-out moving mechanism
22 calibration test unit
22A calibration test piece for flaw detection sensor
22Aa test surface
22B the calibration test piece for the image-capturing sensor
22Ba test surface
23 calibration test unit forward/backward moving mechanism
101 reactor vessel
101c, 101d nozzle

The invention claimed is:

1. An inspection method for inspecting a body, which is to be inspected, the body being provided in a nuclear power plant,
the inspection method comprising:
arranging an inspection device having an inspection unit and a calibration test unit at a reference position where the body which is to be inspected is inspected;
subsequently moving the calibration test unit, while placing the inspection unit at the reference position, forward or backward with regard to a track where the inspection unit makes push-out movement to the inspection target portion of the body which is to be inspected, and calibrating the inspection unit after moving the calibration test unit forward or backward;

subsequently moving the calibration test unit from the track while placing the inspection unit at the reference position; and subsequently causing the inspection unit to inspect the inspection target portion, wherein after moving the calibration test unit forward or backward while placing the inspection unit at the reference position, calibrating the inspection unit by making the inspection unit the push-out movement so as to contact the inspection unit with the calibration test unit, and by rotating the inspection unit contacted with the calibration test unit.

2. The inspection method according to claim 1, wherein inspecting the body by using the inspection device, the inspection device includes a device frame installed at the reference position for inspecting the body;

the inspection unit provided on the device frame, for inspecting the inspection target portion of the body;

an inspection unit push-out moving mechanism for pushing out and moving the inspection unit to the inspection target portion while the device frame is installed at the reference position;

the calibration test unit provided on the device frame, for calibrating the inspection unit; and a calibration test unit forward/backward moving mechanism for moving the calibration test unit forward or backward with regard to a track where the inspection unit makes push-out movement in such a state that the inspection unit is installed at the reference position, the inspection unit includes a flaw detection sensor that comes into contact with the inner surface of the nozzle and performs flaw detection and an image-capturing sensor for capturing an image of the inner surface of the nozzle, which are arranged in a row along the central axis, and the calibration test unit includes:

a calibration test piece for the flaw detection sensor for calibrating the flaw detection sensor and a calibration test piece for the image-capturing sensor for calibrating the image-capturing sensor, which are arranged along the central axis in alignment with a position where the flaw detection sensor and the image-capturing sensor are arranged in a row.

3. An inspection method for inspecting an inner surface of a nozzle provided in a reactor vessel, the inspection method comprising:

inserting an inspection device including an inspection unit and a calibration test unit into inside of the nozzle;

subsequently moving the calibration test unit, while placing the inspection unit at the reference position, forward or backward with regard to a track where the inspection unit makes push-out movement to the inner surface of the nozzle at a reference position where the inspection device is inserted into the inside of the nozzle, and calibrating the inspection unit after moving the calibration test unit forward or backward;

subsequently moving the calibration test unit from the track while placing the inspection unit at the reference position; and subsequently causing the inspection unit to inspect the inner surface of the nozzle, wherein after moving the calibration test unit forward or backward while placing the inspection unit at the reference position, calibrating the inspection unit by making the inspection unit the push-out movement so as to contact the inspection unit with the calibration test unit, and by rotating the inspection unit contacted with the calibration test unit.

4. The inspection method according to claim 3, wherein, contacting an internal abutment member of the inspection device at the reference position with the inner surface of the nozzle so as to align the inspection device with a central position of the inner surface of the nozzle, subsequently adhering a suction unit of the inspection device to a wall surface around the nozzle so as to maintain a state that the inspection device is aligned with the central position of the inner surface of the nozzle.

5. The inspection method according to claim 3 further comprising, after the causing the inspection unit to inspect the inner surface of the nozzle, moving the calibration test unit forward or backward with regard to a track where the inspection unit makes push-out movement to the inner surface of the nozzle at the reference position and calibrating the inspection unit after the inspection.

6. The inspection method according to claim 3, wherein inspecting the inner surface of the nozzle by using the inspection device, the inspection device includes a device frame inserted into inside of the nozzle;

the inspection unit provided on the device frame, for inspecting the inner surface of the nozzle;

an inspection unit push-out moving mechanism for pushing out and moving the inspection unit to the inner surface of the nozzle while the device frame is installed in the inside of the nozzle;

a rotation moving mechanism for rotating and moving the inspection unit about a predetermined central axis along a peripheral direction of the nozzle while the device frame is installed in the inside of the nozzle;

the calibration test unit arranged on the device frame for calibrating the inspection unit; and a calibration test unit forward/backward moving mechanism for moving the calibration test unit forward or backward in the direction along the central axis with regard to a track where the inspection unit makes push-out movement, the inspection unit includes a flaw detection sensor that comes into contact with the inner surface of the nozzle and performs flaw detection and an image-capturing sensor for capturing an image of the inner surface of the nozzle, which are arranged in a row along the central axis, and the calibration test unit includes:

a calibration test piece for the flaw detection sensor for calibrating the flaw detection sensor and a calibration test piece for the image-capturing sensor for calibrating the image-capturing sensor, which are arranged along the central axis in alignment with a position where the flaw detection sensor and the image-capturing sensor are arranged in a row.

* * * * *